Sept. 22, 1964 D. RUBENSTEIN 3,150,032
ABUSE RESISTANT ARTICLES OF MANUFACTURE
AND METHOD OF MAKING
Filed June 25, 1956 4 Sheets-Sheet 1
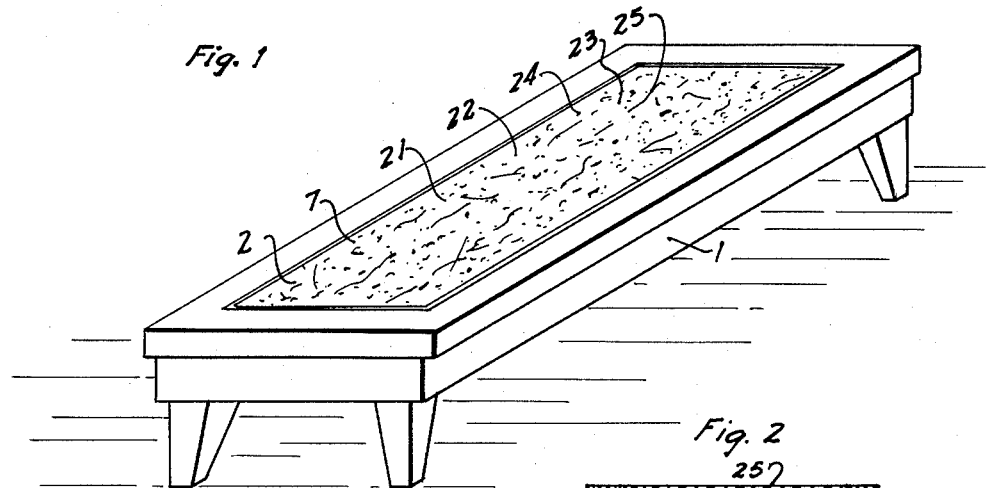
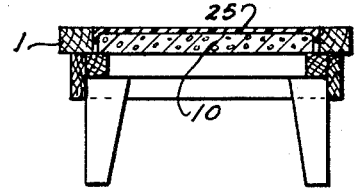
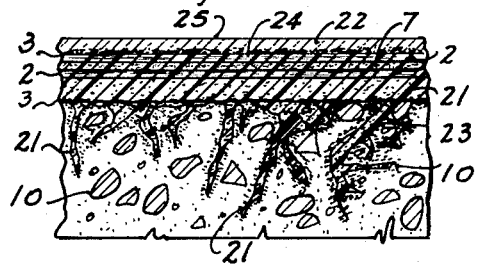
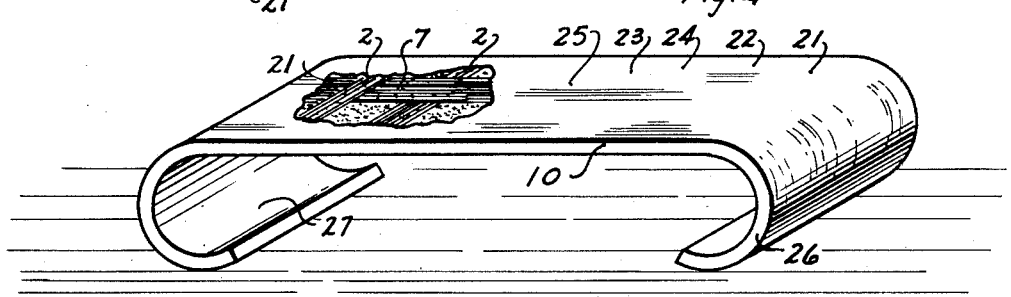
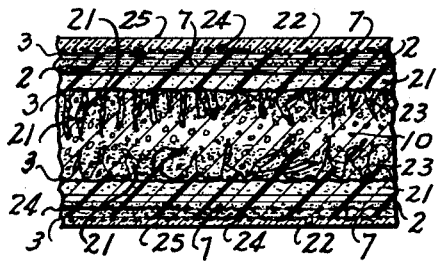
INVENTOR.
BY David Rubenstein

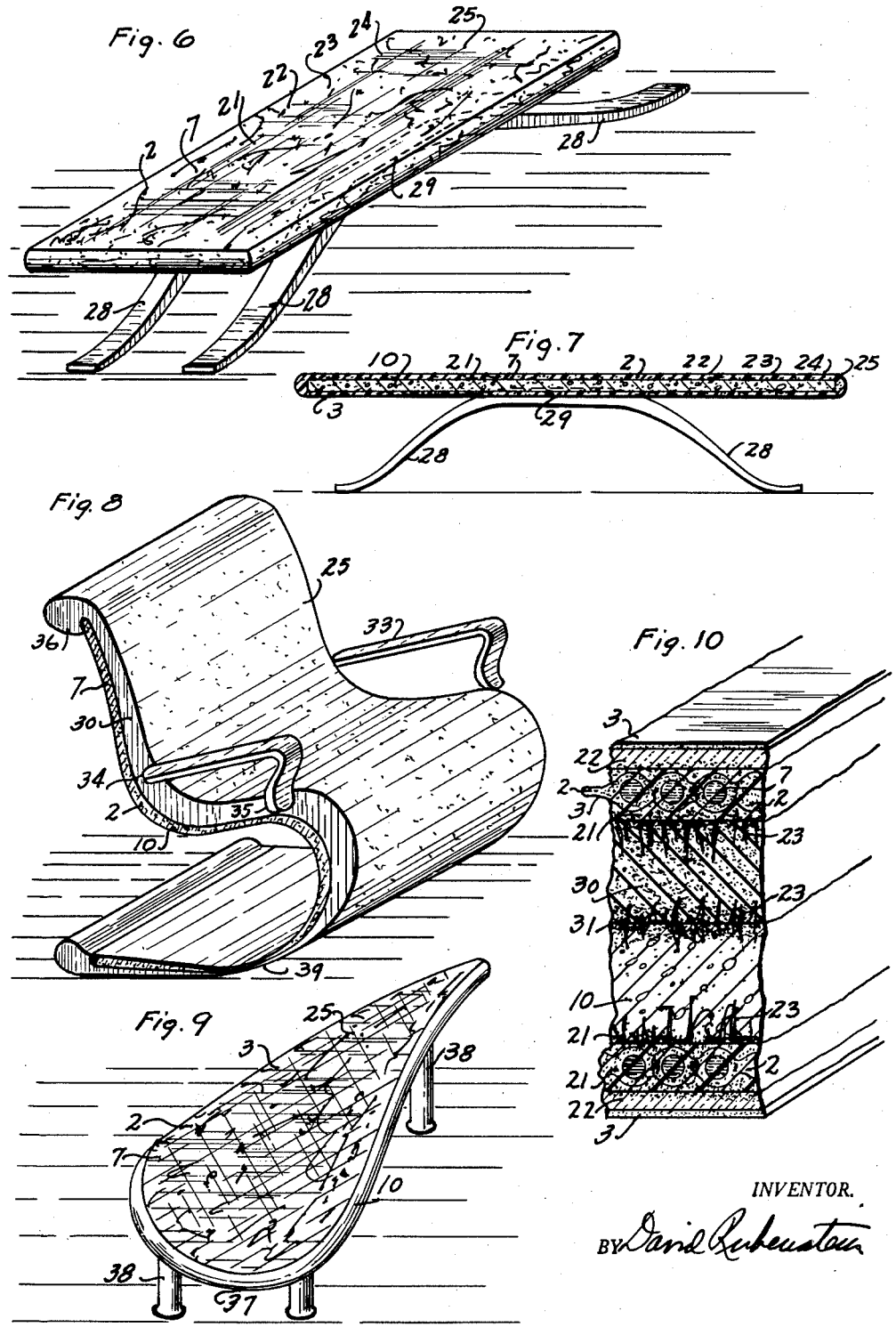

Sept. 22, 1964 D. RUBENSTEIN 3,150,032
ABUSE RESISTANT ARTICLES OF MANUFACTURE
AND METHOD OF MAKING
Filed June 25, 1956 4 Sheets-Sheet 3
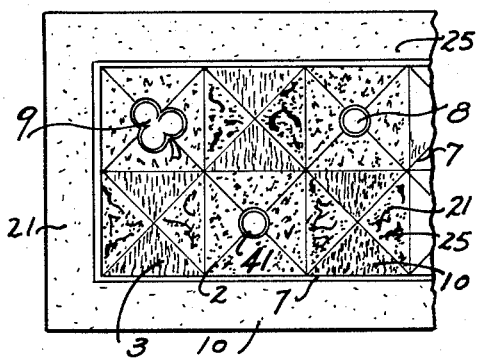
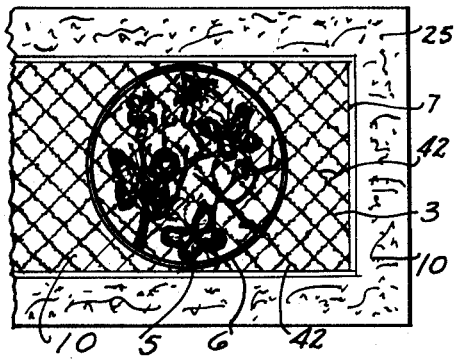
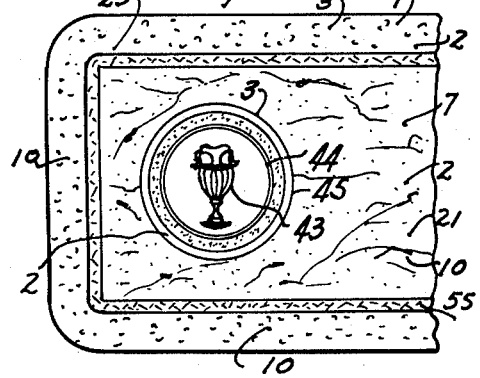
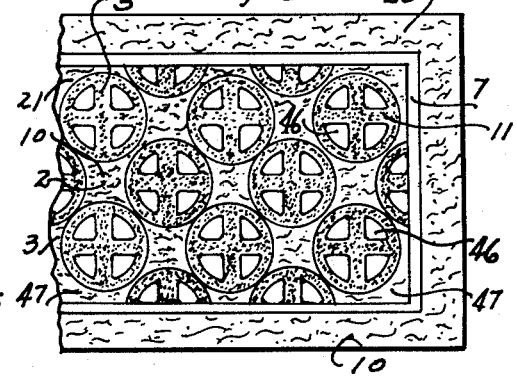
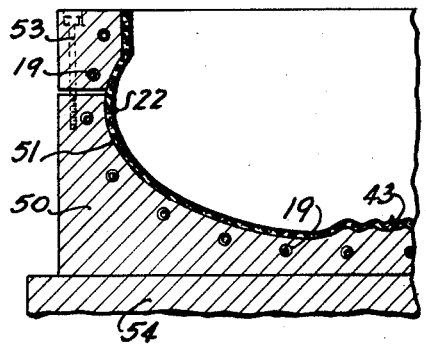
INVENTOR.
BY David Rubenstein Sept. 22, 1964 D. RUBENSTEIN 3,150,032
ABUSE RESISTANT ARTICLES OF MANUFACTURE
AND METHOD OF MAKING
Filed June 25, 1956 4 Sheets-Sheet 4
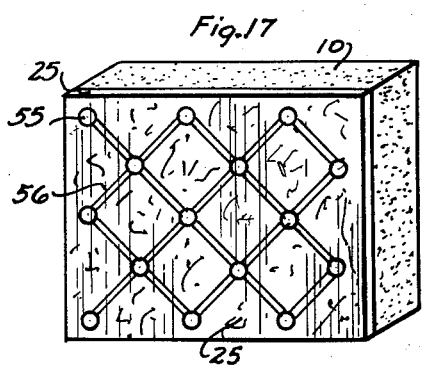
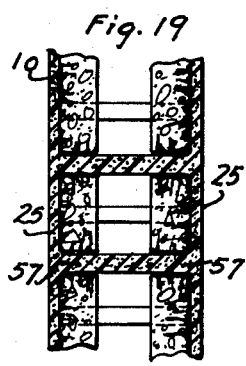
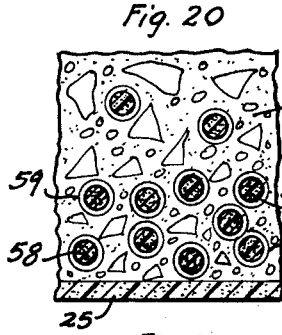
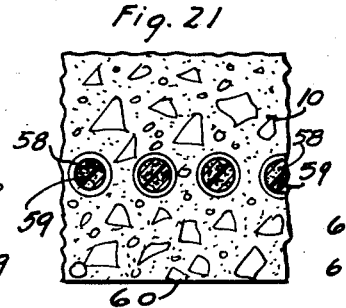
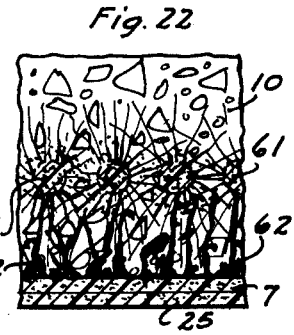
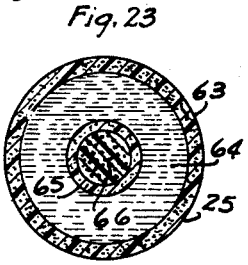
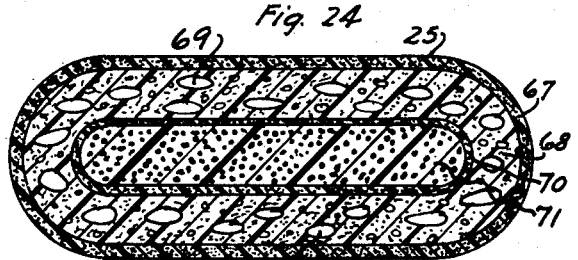
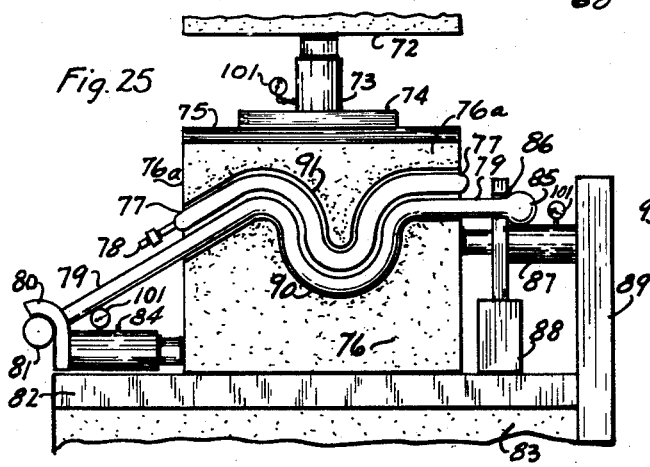
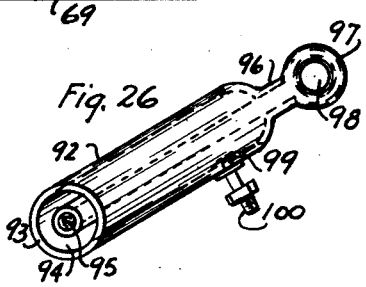
INVENTOR.
BY David Rubenstein

United States Patent Office 3,150,032
Patented Sept. 22, 1964

3,150,032
ABUSE RESISTANT ARTICLES OF MANUFACTURE
AND METHOD OF MAKING
David Rubenstein, 2750 2nd Ave., San Diego, Calif.
Filed June 25, 1956, Ser. No. 593,467
15 Claims. (Cl. 161—161)

This invention relates to decorative-structural prestressed preloaded articles of manufacture and method of making thereof. Embodiments shown are illustrative of the invention and relate to articles of furniture and fixtures, and generally moveable constructions, and elements for use therein. The invention relates to high tensile strength elements of individual or composite construction in combination with porous light-weight core-like elements of low tensile strength used in structural unitary resulting combinations or as high tensile strength elements supporting or reinforcing porous light-weight core-like elements.

More specifically, the invention relates to decorative-structural elements and articles of manufacture having a pore-like body of a core-like character which advantageously is of a material of a substantial compression value and of a low tensile value particularly adapted to the retention of prestressed preload, and which can be of an aggregate-type material, or of expanded material, or of a plastic resin, shredded wood fiber bound together with a cement or an adhesive, fiber mats of organic and inorganic material alone or together as elements thereof, natural material like balsa wood, plywood, expanded light-weight bound aggregates of clay or shale, or in fact any suitable porous or hole filled body which can be provided with an integrated and combined reinforcing plastic integrant of a decorative-structural character and which extends into the pores and interstices of the body, the plastic resin of which extends into the pores and the interstices of the body so as to adhere to the extensive surfaces of the porous body in its structure and with minute finger-like or even with substantial projections, to grip its structure in a physio-chemical bond. Further, the present invention provides a plastic layer which extends into the pores of the body and a component, or more than one component, in and of the plastic layer that joins individually or collectively of either of them in chemical bond with a component of, or of components thereof, of the porous body.

Such articles of manufacture further relate to the structural reinforcement provided by the elements comprising the articles of manufacture by means of using the features and characteristics provided by fibers or fibrous materials including but not limited to such fibers as fiber glass, polyester fibers of polyethylene-terephthalate (Dacron), acrylic fibers (Orlon), nylon, rayon, sisal, hemp, jute, ramie, bamboo, asbestos, cellulose triacetate (Arnel), cellulose acetate, (Fortisan-36), aluminum, Alundum, quartz, ceramic, Teflon, or reinforcements of minute glass balls or ceramic balls, fire expanded aggregates, or any other reinforcement of a similar nature, as well as plastic resins, foamed plastics, polyester resins, modified polyester resins, vinyl resins, polyvinyl chloride resins, epoxy resins, acrylic resins, phenolic resins, silicone resins, furane resins, and compatible combinations thereof, or of elastomeric materials alone or in combination with the plastic resins, wherein the plastics are used as both primary and secondary reinforcement and by and with the full use of the art of plastics and resins as applied to the instant invention.

In the present state of the art with respect to fibers, the wider use of fiber glass, polyethylene-terephthalate (Dacron), nylon, and sisal is reflected in more stabilized costs and are preferred generally for the various purposes to which fibers are used in the present invention. Of the most preferred at present, fiber glass in the form of roving, chopped roving mat, fabric, non-woven fabrics, unidirectional strands, multi-directional strands and fabricated composite fibrous assemblies meet a great many needs of my inventions. However, sisal or hemp, polyethylene-terephthalate (Dacron), nylon or the like frequently can be used alone or in combination to provide features with fiber glass or not possible with fiber glass alone.

It is here noted that I recognize the present state of the art of reinforcement and decoration wherein plastic resins and fibers are used as in a rapid developing state. New features and new developments in the materials themselves and in their recommended uses appear from basic manufacturers in rapid succession. The present invention is concerned with new and novel uses of materials like the plastic resins and fire expanded aggregates as it is with fibrous materials like polyethylene-terephthalate (Dacron) and fiber glass etc., to provide compatible combinations of said materials in articles of manufacture in new and novel features of manufacture. In many constructions of the present invention the combination of plastic resins, and/or foamed plastics, and/or elastomeric materials and expanded materials like fire expanded clay or shale particles is preferred.

An object of the invention is to provide decorative-structural prestressed reinforced structural elements wherein articles of manufacture like furniture such as tables, chairs, beds, benches, davenports, couches, and the like, as made by or with the materials of the present invention, are of an almost indestructible nature and strength.

Another object of the present invention is to provide elements of the constructions of light-weight in relation to their high strength.

Another object is to make such articles of manufacture or major components thereof in one manufacturing operation from previously prepared preforms such as by molding or casting such components or elements in a mold and removing a finished article or part thereof.

Yet another object is to provide articles of manufacture of the invention wherein the decorative-structural embodiments are manufactured by formulated compounds which provide in one molding of the ingredients, color, design, pattern and reinforcement, as structural reinforcement and/or as prestressed reinforcement and which articles of manufacture have a fine quality surface appearance and finish as from a mold.

Another object is to provide articles of furniture which do not burn and/or which on the incidence of contact with fire, are self-extinguishing or non-burning at points of contact with fire, or if in a fire or heated condition to a temperature of about 1200° F., will char but which will not flame for at least a period of five minutes at which time the char will have progressed to the state of non-flammability or the resistance of the materials of the invention to flame provides non-flaming constructions.

An object is to provide articles of furniture wherein the elastic and plastic properties of the materials of the present invention or the like, provide resilient articulative constructions able to withstand both normal use and abnormal abuse as occurs in prisons, schools, places of assembly or in places of boisterous living, or the like.

Another object is to provide articles of manufacture where the spring action inherently provided in the materials of the invention by their compounding and formulations thereof, furnish articles of furniture or of manufacture with much more comfortable response to human beings by responding to variations in human contour and weight by responsive resilient accommodation and comfort.

A further object is to provide articles of manufacture of wide use, such as furniture, possessing great beauty and provided in a most economical manner, especially wherein beauty is achieved by the use of natural minerals, stone particles, petrified wood, sand, Alundum, silica, tufa, volcanic expanded and provided materials, onyx, marble, granite, quartz or the like, as occurs in nature in or of igneous and plutonic intrusions, pegmatite dikes and miarolitic cavities, ore veins, contact-metamorphic ores, metamorphic rocks, alluvials, or limestone quarry type materials, with stable color characteristics and wearing and exposure resistant qualities in accord with the needs of the present invention. These materials in any of the structural and aesthetic uses of the invention may be used with other inorganic or organic materials, with or without wood, and combined with plastic resins, adhesives, elastomeric rubber-like materials, rubber and reinforcing fibers and reinforcing plastics to make unitary structural articles of manufacture or components thereof.

Another important object is to provide prepared packaged ready-for-use polymerizable decorative-structural elements in a "preformed" state as the term is understood in the manufacture of laminated or molded plastics products, wherein the prepared decorative-structural elements may be mass produced to achieve low cost of the constructions and which as originally mass produced as polymerizable elements, or with additional elements added at the time of final end use manufacture provide said packaged ready-for-use elements as finished articles of manufacture when the elements are polymerized in a finished state of manufacture.

Such decorative-structural elements as provided will take up much less storage room or shipping space in their packaged prepared ready-for-use polymerizable state and may be stored reasonable periods of time, i.e., three months, six months and even longer before "shelf life" is exhausted, and if kept at tempeartures of about 40° F., or thereabouts, can be kept for much longer periods of time. In the case of chemosetting materials not involving polymerization which are useful in the present invention, packaged multi-enveloped constructions which keep individual ingredients separated until the envelopes are opened for final manufacture, provide means of keeping aesthetic and functional components in their best state for long periods of time and ready-for-use in final manufacture.

Widely separated end product and even partially completed components of the articles of manufacture of the present invention can be provided from the utilization of standardized features supplied by mass production techniques, and, when orders for delivery are based on individual specific features of style, color, texture and decorative elements, the standardized packaged ready-for-use pieces can be combined with elements or the materials processed by special methods of the invention to meet the detailed requirements of either individual finished pieces or of quantities of like aesthetic and functionally designed articles of the manufacture. The invention makes inventory of such articles of manufacture easier to keep and of fewer pieces and which requires much less investment in inventory on hand. Mass producers of components of the invention materials can provide components from centralized plant, to enable or plants of production, to enable many small processors of the final end products of manufacture ready-for-use components.

The processing methods and the materials of the process provide a delightful non-uniformity of color, texture, and even pattern, and other decorative features usually not obtainable in mass produced articles of manufacture as hereinbelow described and claimed.

Another object is to provide inlay patterns in decorative bodies and surfaces without the tedious work of cutting and fitting and gluing pieces of plastic, wood, or mosaic tile or the like, or cementing the same or any similar substances or usable substances together into an object of inlaid aesthetic beauty.

Another object is to provide filigree or open work or pierced patterns in decorative-structural constructions in an improved manner.

An object is to provide articles of manufacture like funiture which have features of art or sculpture therein provided by low-relief molding and wherein color, pattern, texture and form are achieved in the molding of the articles.

Although in the acocmpanying drawings I have shown preferred embodiments of my invention, and have described the same and various modifications thereof in this specification, it is to be understood that these are not intended to be exhaustive but on the contrary are chosen for the purpose of illustrating the invention in order that others skilled in the art may so fully understand the invention, its principles and the application thereof that they may embody it and adapt it in numerous forms, each as may be best suited to the requirements of its particular use.

The present invention provides articles of manufacture which, while having a unity or compatibility of decorative character when used in the same structure, yet have such pleasing and irregular variations as to provide interest and aesthetic beauty and character in the surface. The invention also provides means of and controlled surface texture or polish by a molded plastic layer, but with a decorative character provided by reinforcing and/or filler in the plastic mix. Colors or any specific individual color may be systematically or irregularly incorporated into the plastic composition independently of such decorative character, or the filler, or reinforcement may be colored, either in its natural state or by means such as staining, dying, coating, impregnating and permeating.

A very important feature of the invention is the providing of decorative-structural surface constructions of plastic resins and associated components in which scratches or small cuts are masked or blended into the surface appearance of the plastic layer. It is possible to assemble my invented structural members and constructions with plastic layers of different color or finishes into innumerable aesthetically pleasing patterns or combinations wherein non-uniformity of design is applied to color or texture or finish and may be combined in the structure with uniformity of design as applied to size, shape, line and contour. Mass produced articles of manufacture like furniture as from the same mold are provided with delightful, enchanting, pleasing color variations, texture variations, and aesthetic appeal on a production line basis.

This application is a continuation-in-part of my co-pending applications Serial No. 558,771, now abandoned, and Serial No. 558,772, filed January 12, 1956, now U.S. Patent No. 2,951,001, which applications are continuations-in-part to my copending applications Serial No. 229,852, filed June 4, 1951, now U.S. Patent No. 2,850,-890, Serial No. 345,084, filed March 27, 1953, Serial No. 498,715, filed April 1, 1955, and Serial No. 514,661, filed June 10, 1955, now U.S. Patent No. 2,805,448.

The use of stone or marble for articles of furniture and fixtures in tables, dresser tops, coffee-table tops, and in features of chairs or beds is known and the beauty of such articles is appreciated. The weight of stone or marble in such use is great and the cost of manufacture and handling such articles is so expensive that few people can afford them. Also the natural marble or stone is fragile and breaks.

In my research and development of the inventions hereinabove and hereinafter mentioned I have found that features of said inventions when adapted for the present invention can provide very worthwhile improvements in aesthetic and utilitarian features in and of the articles of manufacture of the present invention and provide these delightful and useful articles at low cost.

The decorative-structural constructions in the present invention are prestressed structures and constructions, including stressed-skin laminated constructions as single constructions or combinations of constructions having cores of perlite, vermiculite, pumice, volcanic, silica, carbonate, or expanded clay or shale aggregates, lightweight concrete, gypsum, metal reinforced cores of nonmetallic materials, plywood, cemented wood fibers, pressed wood wastes, processed compacted organic materials, foamed concretes, foamed filled plastics with fillers such as commercially pure silica, or carbonate, or complex mineral type fillers, which are used with vinyl foam, rubber foam, isocyanate foam, polyurethane foam (made from adipic acid type polyester and isocyanate), foamed polyether, vinyl plastisol elastomeric foams (elastomer or Dennis processes, e.g.), chemically blown vinyl chloride foams with either inter-connecting cells or unicellular cells, rigid and/or flexible urethane and vinyl foams that are foamed in place like "Lockfoam" (Lockheed Aircraft Co.), and vinyl sponge, or the like. Included are light-weight structural elements, slabs, shapes and the like, of a sponge, or a foam nature, like vinyl foam that can be made by being mechanically blown with a gas or made like vinyl sponge of either closed cell or open cell type which is chemically blown vinyl.

The core material is advantageously selected for its duty in the designed articles of manufacture in its features of porosity and related capillary characteristics in which said features provide the core material with means used in the integration of the core material with prestressed elements, including and providing a stressed skin and reinforced body on at least one side of said core material in the making of a decorative-structural article of manufacture.

The core material can be used as a core of table top wherein the prestressed element in combination with, or in and of, a stressed skin construction provides a table with a stressed skin table top supported by prestressed element in combination therewith. With the core as a foundation or beginning element, the combination of core material and prestressed reinforcement such as a fiber glass cable-like structure which can be a component of a stressed skin prestressed reinforcement can provide multi-functional uses of the skin stressed features of the instant invention.

The core materials herein mentioned, and while not limited thereto because they are mentioned, as used are selected for structural load bearing purposes, i.e., as in the case of light weight expanded type concrete core material, or rigid type structural foamed materials, or when required rubbery elastomeric type foam for resilient structural uses and purposes as elements of compatible sandwich type constructions or as cushions, pads or resilient cores within cores or constructions.

The core material generally shapes the entire article of manufacture or major components thereof by their contour and perimeter of enclosure and also can be used for single function uses that provides the core for a stressed skin decorative-structural table top or it can be used for multi-function uses as does a shaped, prepared, ready-for-use preformed core for a chair that provides the structural embodiment of the core and because of the type of material used as core material provides a resilient cushion in at least a portion of the core body, and which core materials can be prestressed into unitary skin stressed reinforced articles of manufacture i.e., combination with the features of this invention.

The manufacture of articles of furniture and the like, is essentially a building up of pieces into supporting frames upon which to provide useful surface constructions. It is usually an assembly of many pieces and the steps of production follow one after the other as in the making of a wood framed chair with an upholstered construction, with or without spring reinforced upholstery or rubber-foam reinforced upholstery, and if desired, with the wood components suitable for exposed portions and which are finished with stains and varnishes or paint.

The present invention provides articles of manufacture like furniture by molding and casting and thereby reduces the numerous detailed operations of manufacture to only a few. The finishing of the article is accomplished at the same time its structural integrity is achieved. Much time is saved.

The finish surfaces of the present invention are surfaces of integrated materials which embody advantageously color and other features clear through the body or in substantially a major portion of the surface construction. The exterior layer, so called, is not separated from the main body. It is an integrated structure.

Because the surface construction and the body construction of the article of manufacture are capable of integrated construction, the features of prestressing can be accomplished advantageously in one and the same operation of total manufacture of an element or of a whole construction and in which the materials used in the combination are individual raw or processed materials or may be prepared packaged ready-for-use components integrated into the final end use.

Many of the castable and moldable materials of use in my invented articles of manufacture, like furniture, generally are accompanied by a "shrinkage" phenomenon which materially or even slightly reduces the volume of the materials when they are "set." Core materials herein described, may possess a shrinkage characteristic.

However, if certain of the materials do not possess substantial shrinkage properties but do possess a suitable porous structure, they are useful by reason of the material to be prestressed by forces derived from plastic resins or the like, placed in and on and of their porous bodies.

The materials of the laminated structural layer comprising the prestressing elements of the present invention are selected for their properties of suitability to providing permanent force systems of preload in and of the constructions. Some of the materials useful in the present invention comprise materials in liquid, paste or even solid form, which in the processing become flowable materials with advantageously designed and disposed penetrating and permeating characteristics. When converted by chemosetting or by chemical reaction or by polymerization from their fluid flowable state or phase, the elastic limit of the material formed, as in a cured set plastic resin, is advantageously substantially generally greater in potential amounts of elastic limit than the porous body in the present use. At the same time that the fluid flowable phase of the say, polymerizable material is converted to a solid, the polymerizable material shrinks in volume. In the features of the present invention "shrinkage" forces are controlled to provide both unidirectional and multidirectional prestressed forces of preload.

In the present uses of plastic resins and the like, "shrinkage" is one of the properties of the material most disliked. Tolerances and processing are studied trying to avoid shrinkage. Many research programs are in being in plants and elsewhere trying to minimize shrinkage forces in moldable materials.

In my inventions what is a disadvantage to others I find to be a very great advantage. The force systems which I can provide with the shrinkage features of materials of which for the present plastic resins are preferred, I consider most novel and new and the engineers and A.S.T.M. approved testing laboratory personnel are amazed at the high strength structures I make wherein the shrinkage characteristic of certain plastic resins provide new means of making new type structures by prestressing by forces derived from chemical reactions or captured by forces derived in or by chemical reactions.

In many of the materials useful in my invented articles of manufacture like furniture which are useful as corelike or surface construction materials I find it necessary to reckon with the properties of plastic flow in the materials. Nearly all materials can be made to flow under stimuli. At ambient temperature which is usually the normal use temperature of the said articles of manufacture of the present invention, materials engineering and structural analysis of the materials as used provide means to take into account loss of prestressed preload and due to after shrinkage and/or plastic flow. The art of structural engineering applied to the instant invention provides means for correctly designing any construction as described and claimed herein in its prestressed preload features and also taking into account compensatable losses due to plastic flow. The present invention provides fiber reinforced plastic resin and the like structures in designed compatible use with core-like materials that are improved in a permanent manner, owing to the utilization of reinforcements having a sufficiently high elastic limit in order that these reinforcements may be subjected to both preliminary and permanent tensions which considerably exceed the sum of the possible drops of tension and that, account being taken of these drops of tension, such as say, from plastic flow, the construction made may keep and retain in these reinforcements high permanent tensions which are an important part of the initial tension imparted and placed in the reinforcements.

The materials of the invention, both the core-like materials and the surface structures or constructions, together live in a prestressed state in the present invention and when the cores of the construction are subjected to outside forces such as impact, said cores live under flexural and other loading at the point of contact of impact and adjacent thereto, under more or less compression and does not enter the tensile phase. Thus a compression resistant material of a core-like material, or a rigid expanded plastic, resides in its best use in compression loading. The surface reinforcement also can be in compression loading by designed structural characteristics therein, but finds its best use by the utilization of its high tensile properties in tensile loading. Balanced design of such structures is very economically achieved because compression resistant material can be utilized to its best advantage as can the tensile material in cooperative structural relation thereto. Waste of compression resistant material now present in the constructions of the type to which my inventions can be used, and as herein described, is much less, and can be limited to low limits. Owing to a suitable distribution of the tensional and tensioned reinforcements in the construction the compressive stresses are opposed by the stresses created in the construction by the forces acting thereon, so as to compensate them in a most efficient manner.

Having generally described the various features employed in the present invention a better understanding of the invention is provided by the explanations and examples herewith and by the following drawings.

In the drawings,

FIGURE 1 is an isometric view of a table the top of which is marble-like in appearance and the materials of this invention, FIGURE 2 is a section through such a table as shown in FIGURE 1 and shows the laminated construction of the marble-like top, FIGURE 3 is an enlarged partial section of the marble-like top showing features of its construction of the invention.

FIGURE 4 is an isometric view of another table-like structure which type of structure can be adapted to other uses such as machinery housing and in which a core-like material of the invention is enclosed in a stressed skin.

FIGURE 5 is an enlarged cross-section of a portion of FIGURE 4, showing the elements of the construction.

FIGURE 6 is an isometric view of another table-like construction in which a packaged prepared ready-for-use combination of elements provides stressed support elements to a core-like body which is itself skin stressed construction, FIGURE 7 is a cross section of the construction of FIGURE 6.

FIGURE 8 is an isometric view of bench construction in which the spring like features inherent in the materials of the construction are featured.

FIGURE 9 is an isometric view of an irregularly shaped table of the type of FIGURE 6.

FIGURE 10 is an enlarged view of an element of the constructions showing prestressing features of the invention.

FIGURE 11 is an enlarged view of an element of the construction showing decorative-structural constructions with inlay features.

FIGURE 12 is an enlarged view of an element of the construction showing decorative-structural constructions with filigree features.

FIGURE 13 is an elevation and section of an element and its related construction showing prestressed reinforcement employed in an open work pierced construction.

FIGURE 14 is a view of an article of manufacture of the invention showing features of art or sculpture.

FIGURE 15 shows a fragmentary, sectional view of a mold with a thin, pellucid film applied thereto.

FIGURE 16 shows a sectional view similar to FIGURE 15, but after the plastic composition for the facing layer and the core-like body of the structural element have been applied over the film in the mold and pressed therein.

FIGURE 17 is an isometric view of an element of construction having spaced holes in the body which is a core-like body material particularly adapted to prestressing and reinforced with fiber reinforced prestressed surface constructions as laminations, portions of which protrude into the body of the core-like material in its spaced holes.

FIGURE 18 is an enlarged section through a portion of FIGURE 17.

FIGURE 19 is a partial cross-section of two spaced apart core-like bodies joined in resilient joinery by prestressed reinforced plastic fiber protusions structurally cooperative with and a part of surface construction laminations disposed on the exterior faces of the spaced apart core-like bodies.

FIGURE 20 is a partial section of a core-like body packaged in a ready-for-use reinforced plastic integration and lamination, the body of which core-like material of capsule-like plastic resin reinforcements and expanded fired clay aggregates, or the like, upon the activation of the plastic resin constituents by a chemical reaction of conversion provides a unitary prestressed preloaded construction.

FIGURE 21 is a partial section of a core-like body containing packaged plastic resin bodies of material placed in the core-like body at the time of its manufacture, the plastic resin bodies of material ready for conversion from its packaged form through a fluid phase into a solid state.

FIGURE 22 is a partial section of a core-like body as shown in FIGURE 21 after a surface construction lamination is laminated thereto and the packaged plastic resin reinforcement has been released within the body and the construction made into a unitary construction by a chemical reaction of the materials induced by means such as heat and/or pressure.

FIGURE 23 is a cross-section through a cable-like reinforcement of fibrous material wherein the fibrous cable-like construction is enclosed in a plastic envelope surrounded by a fluid and all enclosed in an outer plastic sheath envelope adapted to resist expansion.

FIGURE 24 is a cross-section through a belt-like reinforcement and ready-for-use laminated layered materials having high tensile strength fibrous reinforcement enclosed in a packaging envelope which is surrounded by a thick layer of expandable plastic such as plastic resin or elastomeric plastic compounds and all enclosed in an outer plastic resin envelope as a packaged ready-for-use construction suitable for pressure balanced prestressing.

FIGURE 25 is an elevation of a pressure device for providing prestressed preloaded constructions of the invention by pressure balanced prestressing.

FIGURE 26 is an isometric view of a portion of a cable-like construction of the type of FIGURE 23 showing the end anchorage device thereof.

By way of explanation the figures above given are diagrammatic with respect to the thickness of the film or the facing layer, such thickness being exaggerated for clarity as are other dimensions in some of the figures.

In Serial No. 229,852 filed June 4, 1951, now U.S. Patent No. 2,858,890, I describe sandwich type constructions as laminations which incorporate load bearing features with decorative features of color, or of luminescence, or smooth highly polished surfaces, or mat or textured surfaces and which can also be sandwiched to components of any one of a number of types, one of which could be an expanded flotation material, which is light-weight, non-rigid, expanded product that is based on a styreneacrylonitrile copolymer combined with a butadiene-1,3-acrylonitrile copolymer. This laminate is characterized by high resistance to compression in comparison to its low density (6 to 8 lbs.) per cu. ft., by low water absorption, and by low thermal conductivity. This product I described as also possessing a high degree of resistance to various chemicals and solvents, particularly petroleum products such as kerosene and fuel oil. Another expanded plastic mentioned therein that can be incorporated in a laminated construction is that of diisocyanate foamed material which is composed of two alkyds and an isocyanate. When all three are put together and water added the material foams in place.

The constant expanding plastic resin technology has many features available for the present invention among which are desirable characteristics like resilient resisting constructions for cores, sound proofing, moisture proofing, shock proofing, light weight, color, design, thermal non-conductivity or conductivity, smoothness, texture and load bearing capabilities in tension, compression, shear and torsion. Other features that laminations can provide as disclosed therein are waterproof surfaces that will not deteriorate under interior or exterior conditions of extreme heat or cold, dryness or dampness and that are impervious to mildew and rot. Also resistance to attack by insects, ants or termites is afforded, an important feature in certain South American countries.

The use of molded fiber glass construction for articles of manufacture is known wherein the fiber glass plastic resin construction is a single entity construction. A conventional construction could be a lamination of fiber glass and plastic resin "layed up by hand" or placed in a press, or other suitable means, and formed to the desirable shape required, and cured in the means provided at about 250° F., when resins like conventional polyester resins and fiber glass cloth or mat are used. The fiber glass is frequently "preformed" to an approximate shape for subsequent molding with the selected plastic resins or resin.

In the improvements provided by my Patent No. 2,671,158 the laminations of fiber glass and plastic resins and other compatible materials are packaged in a ready-for-use state, and include in the package heating means such as resistance heating means wherein the polymerizable resins of the package can be polymerized with ease by anyone, skilled or not, in or not in a mold, or in inaccessible places like in the inside of a cable of fiber glass strands inside of a concrete body. The ease of fabrication of fiber glass and plastic resins in constructions is apparent from a reading of said patent and the features of my patent are useful in the present invention.

In the present invention I provide an improvement in articles and means of manufacture of the articles disclosed and claimed herein wherein the advantageous use of fiber glass reinforced plastic resin construction as tensile reinforcement in combination with core-like material of substantial or high compression strength provide features and constructions at lower costs. The required tensile strength features in my articles of manufacture are provided in a much more efficient manner in any of my constructions by using as little as one layer of fiber glass mat or cloth or unidirectional fibers. In conventional constructions to perform a similar job of use, several plies of fiber glass are used which also requires much more plastic resin to compete strength-wise to my constructions. In conventional constructions of laminations of fiber glass no benefit is taken from the great strength to be obtained from the plastic resin when the plastic resin exists in the construction in a prestressed state or from the additional strength derived from the fiber glass when it is also in a prestressed state. The benefits of shrinkage of the resin is lost except in so far as the lamination of conventional construction is under internal stress and made more dense. In any structure the theory of bending and the properties of sections as in a simple beam can be applied. In any balanced design the sum of the compressive stresses is equal to the sum of the tensile stresses and the bending moment is equal to the resisting moment. In a conventional lamination of fiber glass and plastic resin two or more essentially different materials make up a composite construction and at times can be considered in their combined action as homogeneous structures and at other times must be considered as two or more widely dissimilar materials or if the plastic resins are used with a filler in their cooperative use with the fiber glass. The use of fiber glass and plastic resin for compressive stresses is an expensive way to use the materials if means of design can provide a lower cost compressive material used in a cooperative use with which ever low cost design method can utilize the maximum advantages from the combination. In the present invention the design method utilizing prestressing provides the means for most efficient design. To work a high tensile fiber with an ultimate strength in tension of anywhere from 300,000 p.s.i. to 5,000,000 p.s.i. to its greatest advantage it should be worked in its normal best use that is tensile loading resistance. By providing whenever possible a maximum lever arm from the neutral axis of any section combining the core-like materials I use with the high strength skin stressed surface constructions the most efficient use is obtained. Thus a core, high in compression value can be combined with a minimum of high tensile fiber when the moment of inertia of the fiber glass is unity, i.e., at the surface because the lever arm of any force in flexure loading is at its longest length. When the resin in my constructions has shrinkage and this exerts its force also in the body of a core-like material from the surface on back into a predetermined depth in the said core-like body, the shrinkage force developed induces a prestressed preload into the structure and the set resin in its finger-like projections and protuberances as anchored in and to the walls of the cells and capillary tubes of the core-like material is also in a prestressed preloaded state. The core-like material, which may have been precast and cured for my use is a "preshrunk" material so that any stresses derived from the shrinkage of the plastic resin when inside of the pores of the core-like material, places the said material in a prestressed preloaded state also. Forces at work can be likened to water, i.e., they flow until a state of equilibrium is reached. Internal stresses beyond the elastic and plastic limits result in a cracked or damaged product.

Referring now to the FIGURES 1–26 the principles of the present invention can be illustrated by these figures. However, no limitation upon articles of manufacture wherein the preferred embodiment as shown in the drawings is intended. It is recognized that the features of the present invention in many useful constructions as they embody it and adapt it in numerous forms may be best suited to specific requirements or particular uses in a most advantageous manner.

FIGURE 1 is an isometric view of a coffee table, or a laboratory table or of an office table. A wooden frame 1 is provided in which a core-like slab 10 is supported. A light-weight core weighing, e.g., 40 lbs. per cu. ft. with a suitable pore structure which may or may not be reinforced with internal reinforcement for handling purposes during manufacturing, but advantageously must be self supporting is shown at 10 in FIGURE 2. A reinforced fiber glass plastic resin construction 25 is integrated to the core 10 by lamination and bonding, which, during the processing of the materials together also provides prestressed preload forces in and of the materials of the combination. In FIGURE 3 the cross-section through the construction 25 is shown integrated to the core-like body 10 by means of finger-like projections 23 comprised of portions of the elastic plastic resin 21 which has flowed into the capillary tubes and pores of the core-like body 10 when the resin 21 and its compatible components as a formulated chemical mixture had been placed therein. The resin 21 is shown adhesively-penetrated-and-permeated-bonded to the core-like body 10 from the surface thereof into the larger interstices into the minute pores. The resin 21 in gel stage meets with resistance of the coarser particles of the core-like material or the cell walls provide obstructions when polymerization converts the fluid resin 21 into solid resin 21. The resin finger-like constructions 23 clutch at and bond to the side walls of the cells and pores of the core-like body 10 and from the shrinkage or expansion occurring in the resin 21 induces prestressed preload into the core-like body 10.

The layer-like body of resin 21 adjacent to the surface of the core-like body 10 extends in, to and of the three layers of fiber glass comprised of two layers of multidirectional fiber glass mat 2 and the layer of unidirectional fiber glass 7 disposed inbetween the fiber glass layer 2. The layer-like body 21 of resin protects the fiber glass from abrasion and wearing contacts from both the exterior surface and the surface of the core-like body 10. The lamination of elements 2, 7 and 21 can be provided with a protective covering 3 or it can be provided as separate elements placed together during the fabrication and processing of the construction.

If the lamination comprising the elements 2, 7, and 21 is supplied in any specific construction in an enveloped package ready for polymerization the envelope 3 can be a "peel-off" type or comprised of a compatible plastic resin which combines with the plastic resin 21 during the polymerization reaction. If a peel-off type envelope is used, polyethylene can be used in such use as a package film material. Also the envelope can be partially cured plastic resin which supports the elements 2, 7, and 21 in package form and upon polymerization the envelope 3 and the elements 2, 7 and 21 combine until they form a unitary structure which also performs the features derived from the prestressed preload from the shrinkage of the element 21. The element 3 comprising the envelope can be a meltable substance which has a melting point below the polymerization temperature of resin 21 and which flows into the core-like body. In this case the material 3 can have specific properties such as water proofing as does silicones or it can be of such a small volume spread out in the core-like material as to offer no objectional features in the polymerization reaction of resin 21 wherever it is in the construction. The envelope 3 can be a carrier means for element 24 comprised of selected particles of discrete size, color and aesthetic characteristics.

In such a table as is shown in FIGURE 1 and detailed in FIGURES 2 and 3 I have used soft desert tones of selected rhodochrosite ($MnCo_3$) associated with pyrite, fluorite, and in which the pink rhombohedral crystals predominate, with colored onyx, silica and quartz-like materials in which the silica was ground to about 200 mesh screen size and the rhodochrosite, onyx and quartz-like materials were of various sizes from dust up to 30 mesh screen size of selected and discrete proportions varied in placement so features of color and particle sizes were in a non-uniform arrangement so that the layer of colored particles 24 when incorporated in the lamination on top of layer 2 and below layer 22 and distributed irregularly in the lower portion of layer 22 provided the features of a marble-top table, i.e., in appearance like a marble-top table but with new and better properties than the natural marble. At intervals featured particles 24 up to say ⅛″ size were used.

The layer 22 which forms the exterior element of the laminated structure can be of clear transparent plastic resin like an acrylic (methacrylate) modified polyester resin having a high degree of color stability and weather resistance (i.e., so the resulting construction can be used outdoors as is a garden table) or it can be a pellucid layer 22 through which the various colors and features are seen in an aethestic featured design of varied color intensities and qualities of depth. Paraplex P–444, an unsaturated polyester containing monomeric methyl methacrylate is such a resin and is blended with vinyl toluene or monomeric styrene to control speed of cure and other desirable properties. Optimum results as obtained on the recommendation of the manufacturer, Rohm and Haas Co., use 80 parts of Paraplex P–444 to 20 parts of added monomer but this can be varied to as high as 25 parts of added monomer to as low as 10 parts of added monomer. In my copending application Serial No. 558,772, filed January 12, 1956, and herein the features of the clear transparent layer 22 provide sparkling, clear, and even magnified illuminated colorful surface constructions as layer 22. Acrylic type resins can make magnifying lenses and in my invented constructions the particle shapes and characteristics when covered by such resins so shape the covering layer as to provide lense-like characteristics of magnification of the colored particles. It identifies features in a most remarkable manner. It is also to be here noted that the various layers like 3, 21 and 22 are for illustration only as the resulting completed structure is a unitary structural entity and that I build as would any good engineer or architect. Also the resin mix design formulation can be modified with say, styrene monomer or other suitable vehicles or components to provide suitable viscosity or to provide the required amount of propelling force derived from the volatilization of the styrene monomer or other component of the mix which forces the resin 21 into the pores and interstices during the processing and with or without additional pressure as from a press. Calcium carbonate, titanium oxide or other fillers also can be components of the mix, as can release lubricants and other resin features. Aluminum foil advantageously perforated can be a component of the layer 24 which may or may not be completely covered by the aggregates of colored materials.

The core-like element 10 is dried and heated in an oven or on a platen or even in ambient air temperature if the same is of low relative humidity. When dried by heating means to a temperature of about 220° F. or whatever temperature is necessary to provide pores and interstices of the core in a water free condition the core-like body is cooled to a temperature lower than the polymerization temperature of resin 21 and 22 and thus prepared for polymerization of the resin 21 if the same is not completely polymerized or in an unpolymerized condition. The core-like body temperature is important because if too hot the resin 21 cures or gels before it can be driven into the pore structure by means, one of which is pressure and another is the expansion (but not limited thereto) and propulsion of styrene monomer or the like in the resin mix 21. Latent heat is not practical heat for my purposes to cure resin 21 the way I find most advantageous as the body is rapidly losing heat as latent heat and the forces of propulsion which must be generally quickly applied to resin 21 in order to get depth of penetration and permeation of resin 21 into the core-like body are provided by rapid expansion of the styrene or the like. Latent heat by definition is the heat required to produce a change of state at constant temperature as differentiated from sensible heat which is heat which manifests itself by temperature change. Sensible heat is what I find advantageous as the energy is communicated rapidly in sustained volume and not in decaying amplitude analogous to the decay of energy in a vibrating spring as the way I see latent heat energy. Time is a factor in the heat imput to the resin 21 and the advantageous benefits I derive from prestressing features of resin 21 come about when energy conversion from sensible heat to the resin 21 occurs in the manner of the present invention. I relate sensible heat to processing techniques and while latent heat as from a drying tunnel in the core-like body 10 can be used when sensible heat is applied to reduce the heat load on the equipment, latent heat in itself does not provide a sustained energy heat source. In certain materials like polyester plastic resin the exothermic heat provides a heat source when related to time to aid in the propulsion of the polyester resin as resin 21 into the bore structure but for practical production techniques I find that as of now, sensible heat provides controllable features in the polymerization of the resins.

A caul of stainless steel, chrome plated metal, plastic resin, aluminum or any other suitable caul as is shown in FIGURE 15 wherein the surface of the element 50 is covered with a clear transparent layer 22 (by pouring, spraying, brushing, coating or in any other convenient manner). The layer 22 is applied over a suitable release agent previously applied to the caul face and allowed to gel or partially gel to the extent that subsequent applications of resin or materials of the lamination are not disturbed and distributed to the surface of layer 22.

The features of beauty derived from a clear transparent layer require freedom from occluded fine bubbles of air in the finished polymerized layer 22. In mixing the materials of the formulated mixes finely divided solids, granular fillers or features of decoration, pigments, fibers and the like generally entrap air or surface tension features on fibers such as fiber glass tend to hold minute air bubbles so that in the polymerized mix they are visible or are the means of cavities, pits or pinholes formed at the surface of the molded plastic layer 22. By forming separately a film of purer resin, entirely free from such bubbles or cavities and curing body resin 21 and facing layer 22 together into a unitary structural combination the features of beauty to be derived from clear transparent resin are provided to enhance the appearance of the article of manufacture and may be done with or without changing the color or general appearance of layer 21. By making the film of layer 22 of a harder resin or one which is more flame-resistant, these properties may be effectively given to the structural element by the same treatment which assures a surface free from cavities and with the desired features of texture such as mat glaze, high sheen, semi-gloss or other light reflecting features of surface design.

The features that provide surfaces of laminates as patterns, as glossy, smooth, mat textured, mat finished or any combination of alternate stripes, patterns or textures to give artistic, functional or architectural or aesthetic merit to the laminated constructions made can be provided by the caul face characteristics and greatly enhanced by the characteristic of layer 22.

Transparent, translucent or opaque surfaced components are disclosed that have a feeling of "depth," softness, silkiness and the general qualities of "luxury" quality to the finished product. Given any specific formulation the articles made from it can be made in stages so that finished or partly finished products are made at one time but when combined in final assembly produce a laminated construction with specially designed characteristics. The quality and ability to work because of ability to take deformation in the constituent members and elements of the lamination or laminate, or as a balanced designed structure having predetermined functional uses, makes the whole laminated unit or structure more resistive to failure when impacted with impulse loads of extraordinary magnitude, whether in compression, tension, shear or torsion.

Although I have indicated above that the film layer 22 that is applied to the caul face is substantially pure resin, and I have found it advantageous because of the greater ease with which the film may be kept free from bubbles, pinholes and surface irregularities as from unequal internal strains within the body of the plastic resin mix, etc., and greater facility for visual inspection for the presence of such air occluded areas, bubbles, or pinholes, nevertheless the invention may be practiced with a pigmented film or one containing finely divided fillers, especially if it is treated to remove all entrapped gases, e.g., by vacuum, passing through a room at colder temperature, or by roller mill in a vacuum, etc., or heating the resin film enough to flow it into a tight film.

I have recommended the setting of the applied resin film 22 before the thicker facing layer 21 of plastic composition, as this has advantage not only in that it is thus secure against bubbles and imperfections being carried down to the mold surface when layer 21 is applied, but also because the shrinkage of the heavier facing layer 21 puts the already set surface film 22 under compression. This feature of my invention provides prestressed preload into the construction. Thus the surface is stronger against breaking and scratches. This not essential to my invention in its broadest aspect; and if the thicker layer 21 is carefully applied so as not to break through the initial film, advantages are realized.

It is here to be particularly noted that while I take advantage of adhesive bonding wherein thin as possible layers between elements is utilized the adhesive bonding referred to in my invention and preferred is wherein the bonding material is of substantial thickness and forms a structural layer with its own properties other than just adhesion strength. Features of resiliency of structure of combined materials and other functional features are had.

In FIGURE 4 I show a shaped preformed core 10 which advantageously can be made out of an expanded rigid type resin or can be made out of a mixture of pumice expanded aggregate in a sized mix but which is bound together by a plastic resin such as a phenolic resin or polyester resin or epoxy-elastomeric resin in the manner of my invention. This preformed core 10 can be compounded and formed into the preform shape in mass production molds and the resin content of the formulated mix only partially polymerized or completely polymerized. Advantageously, if completely polymerized, so called, I select a plastic resin which cures on exposure to air with a tack which aids in bonding of the layer 21 to the core 10. The core structure 10 is shown of a different type than that in FIGURE 3 and by selection of characteristics related to the plastic resin 21 and 22 as well as the compression resistance afforded for prestressing of the skin-stressed surface construction 25, I advantageously provide balanced design constructions. In such a construction as FIGURE 4 I provide a relatively high degree of elasticity to the combined elements and frequently find that polyethylene-terephthalate (Dacron) fiber in combination with fiber glass provides the kind of elastic construction best suited to such a shape. Obviously, the concept herein described is applicable to many constructions other than those shown herein.

In FIGURE 5 I show a detailed cross-section of a portion of FIGURE 4 showing its balanced design features with equivalent amounts of laminated construction on the upper and lower sides of the core 10. The layer 24 as viewed through the layer 22 provides decorative features embodied in the structure and can be the same on both sides of the construction or it can be of different colors or features on the top as distinguished from the bottom. The curved portion 27 can be different than the top 25 as can the edge 26 be from either when the layer 25 is provided as a packaged preformed ready-for-use element, rather as a three part element, of which the bottom portion of layer 25 used on the under side of the construction is of one color or texture or type of decorative feature and the edge 26 is of a different color, etc., and the top is of still another color, etc. In final polymerization of the integrated article of manufacture the core can be provided in multi-unit stocks on inventory while the aesthetic features can be provided from packaged ready-for-use laminated layers 25 or from combinations of prepared ready-for-use layers 25 and artistic individual features or functional features provided for separate pieces of construction. The molding technique is very versatile in my invention in providing developments and features of non-uniformity as well as of uniformity of design.

In FIGURE 6 I show a table or article of manufacture similar in part to FIGURE 4 and FIGURE 5 but wherein the supports for the table top or the like is provided in the packaged ready-for-use polymerizable construction and which when the construction is polymerized in final end use form is securely a part of the top and firmly supports the top. So called legs 28 are bow-like construction much like an archery bow, the fiber glass 7 being in predetermined amount to and in both strength and in placement to provide the finished shape as well as the required strength. These fibers 7 extend into the layer 25 in a structural load bearing construction and the resin 21 and the film resin 22 are advantageously strong yet resilient as in a spring. The core 10 is enclosed on all sides by layer 25 which layer prestressed by the shrinkage forces in the polymerization of the resins provides a shock resistant, very strong construction.

FIGURE 7 shows a longitudinal cross-section through the top and an elevation of the legs 28 and its connection at 29. The decorative features are provided in this case by crushed marble particles accented with corundum black particles in simulated veins as in marble and the surface finish provided by layer 22 is of a high sheen dulled slightly where particles of corundum reach at or near the outside surface.

Silicon dioxide ($SiO_2 \cdot nH_2O$) of a hardness of 5–6 on Mohs' scale is found in California and in the Queretaro district in Mexico and provides transparent to translucent and often yellow-green highly fluorescent particles of the nature of opal with rainbow-like colors. Such material is infusible and insoluble in and of itself.

Quartz ($SiO_2$) in its many varieties is most useful in the formulations of the present invention as it has a hardness of 7 on Mohs' scale and is also of good colors, from white to black, as violet-colored crystals as amethyst-like particles when ground to proper mesh sizes, to gray or smoky colors, and even rose. Chalcedony occurs in banded forms like agate while chert, jasper and flint provide a variety of color and decorative interest to marble-like constructions which I make as in FIGURES 6 and 7. Generally the silica group of minerals provide both wearing qualities and colorful interest to the constructions. They also provide strength in the mixed formulations. The resultant structural embodiment of a core-like construction 10 wherein aggregates and plastic resin are the major structural load bearing components requires care be exercised in the selection of the aggregates for their specific properties, like e.g., heat resistance or ability to discharge heat rapidly. In the surface layer 22 the properties of the selected aggregates which can be taken from a great many earth rocks or minerals, I find as features of this invention as new and novel constructions. The usual filler materials in plastic resin formulation has been asbestos, calcium carbonate and clay and has come from adaptations from the paint formulation techniques and generally the fillers are fine ground to from 200 to 400 mesh screen. I have departed from this usual filler material by grading and sizing colorful materials like the silicates for properties. Materials that in fine mesh lose their color to flat gray or white, e.g., show much color in larger sized particles. The crystalline habit of the material is studied for its nature, whether, foliated, micaceous or lameliar as tabular crystals and which have micaceous cleavages or whether needle-like as fibrous, acicular or hairlike needles, or if cryptocrystalline of microscopic character, the material being selected from such forms to provide specific properties in the resultant constructions.

The properties desired can be chemical resistance, light ray resistance, heat resistance, moisture resistance and other desirable properties. Compatibility with various plastic resins in both chemical and structural characteristics and active or inert features are considered in making formulations.

In FIGURE 8 I show a bench or chair comprised of a compound curve shape wherein laminations are combined with laminations of the materials of the invention to mold in one piece in its final stage of manufacture the article shown. A laminate much like 25 in the tables of FIGURES 1, 4 and 7 is provided wherein unidirectional strands of fiber glass or polyethylene-terephthalate (Dacron) and fiber glass or in fact any suitable tensile fiber are placed in combination with multi-directional mat of like material and the entire fibrous structure enclosed in plastic resin 21 to provide a supporting member like a core 10, and also providing it in a flat sheet-like form on a polyethylene envelope bottom layer in a polymerizable condition. An elastomeric resin of the type providing a resilient but strong body in an expanded cellular form and of a nature that it will bond structurally in the manner of the present invention is provided in polymerizable form and of various cross-sectional characteristics to respond to compound curvature in the shape shown in the FIGURE 8 as an added layer placed over element core 10. The layer 30 is thus the cushion of the chair upon the core 10 which makes up the structural support for the chair. A layer 25 comprising the decorative features as explained in FIGURES 1, 4 and 6 is placed over layer 30 and a layer of polyethylene placed over layer 25. The lower sheet of polyethylene is heat sealed to the top sheet of polyethylene and thus an enveloped construction in a polymerizable condition is packaged and ready for use at once or at a later date or distant place of end manufacture. Inserts 34 and 35 can be provided for the later use as supports for arms 33 which can be of any desirable material like wood but preferable in this invention if made out of reinforced plastic resin fibrous constructions. The layer 30 gradually thins out in its cross-section until layer 25, as shown in FIGURE 8, at 39 it unites with layer core 10 and continues to the end of the lamination as a spring-like tough strong lamination providing structurally designed support for the chair base.

Such a packaged ready-for-polymerization construction components for the chair of FIGURE 8 when placed in a shaped mold wherein polymerization can take place and "freeze" or congeal or fix or make the chair or the like when the polymerization reaction is completed is an extremely useful packaged construction. If the materials of layers 21, 22, and 30 are of a type that requires heat to initiate polymerization, the mold can be of a heated type having means of variable controllable temperatures for each platen face, or the mold can be only a forming-to-shape type and the resins activated by internal heating means as in my Patent No. 2,671,158, and wherein the temperatures of polymerization of 21, 22 and 30 can be induced by resistance heating and to the same or different temperatures for each layer. Reliance can be placed on chemical catalyzation from catalysts provided in the laminations at the time of mass production preparation and which can be released by osmosis, pressure or rupture. Catalysts or catalyst can be provided distributed on their own fibrous web which web can be a reinforcement like a layer of fiber glass 2 or 7.

At times I find it advantageous to place a pre-tension by mechanical means upon the fibers 7 so that spring-like action can be had in the laminated construction. Pretensioned strands also provide additional prestress preload to that obtained from physio-chemical means so that the resultant construction is much more efficient in many specific uses. Pre-tensioned strands also provide resistance for layer 30 to work against and makes for a comfortable resilient chair. Prestressed constructions like my inventions can be useful in many applications and the described figures are not intended to limit it to the shown articles of manufacture as long as the articles manufactured come within the scope and intent of the disclosed and claimed invention.

Referring now to FIGURE 9, I disclose and claim an article of manufacture like the table shown of a "free form" shape wherein the construction of a compound curve type of outline and perimeter to the table or the like, and without right angle corners but with a flat top and bottom surface meeting the rounded edges of the slab-like construction. The laminated surface construction 25 is essentially like the construction shown in the FIGURES 1, 4 and 6. The legs 38 can be attached by means of inserted anchors cast in the core 10. Such a shape construction as provided by other means can be very costly, but in my invented constructions once a mold or caul of suitable material is made the construction shown can be made very economically.

In FIGURE 10 I show an enlarged cross-section of a construction useful in manufactures of the type shown and especially of the type shown in FIGURE 8, wherein element core 10 and resilient expanded layer 30 are integrated by layer 31 which can be a fiber glass or the like reinforced plastic resin 21 or other bonding means which provides integrated structure and insures complete load transfer between both elements while at the same time providing damping qualities to the construction to absorb shock. The enveloped construction shown in layer 21 wherein the envelope 3 contains oriented and arranged fibers such as fiber glass 7 and 2 enclosed in a substantial quantity of resin 21 illustrates the use of a prepared packaged ready-for-use reinforcement which may or may not be packaged together with elements 10 and 30. A pellucid layer 22 or a clear transparent layer 22 can be produced as a component of the package or it can be produced in the act of lamination of the entire structure. When in packaged condition the materials herein disclosed are preferably in an unpolymerized state but I have found that components can be combined into unitary structures when of a thermosetting type by the tack existing on the cured surface of certain plastic resins or when the surface has been prepared for bonding and integration by sanding the surface or abrading the surface to a substantial amount. However, when I use thermoplastic resins in any of the constructions these can be heat welded in the custom of the specific material used by any of several known heating means. The feature of penetration of finger-like bodies of plastic 23 preferably of a resin which provides prestress preload forces is most useful in preventing delamination of constructions under conditions of stress and works the construction in a prestressed state.

FIGURES 11, 12, 13, and 14 show features which can be incorporated in the previous disclosed FIGURES 1–10. They provide aesthetic and functional features. In FIGURE 11 I illustrate inlaid features wherein core 10 is laminated to a surface construction layer 25 in which an enveloped construction is provided by first laying down a packaging sheet of resin film 3 and assembling thereon elements like 8 and 9 which could be color forms of any type provided as cut pieces from polymerizable ready-for-use laminations or they could be pieces of thin wood veneer backed up with fiber glass strands for integration, pieces of marble slab, colored rocks, fibers, cloth or in fact any organic or inorganic compatible material. A layer of fiber glass 2 or the like can be used and tensional reinforcement 7 used oriented as shown, or as joinery between the sections or pieces, and to generally reinforce the whole construction. Unidirectional fiber glass also can provide pattern.

In FIGURE 11 the variation in pattern can be provided with hemp, bamboo strips, burlap, wood fibers used in directional patterns when placed on a carrier sheet of fiber glass to which an adhesive layer of plastic resin compatible with the laminated construction has first been applied. Exotic woods like amapa mahogany, zebra wood, figured walnut and in fact any of the very thin cut veneers can be laminated with fiber glass, and I find them exceedingly beautiful when bordered by marble-like borders as shown herein. By providing a carrier sheet of fibers these veneers can be stock items ready for lamination simply by cutting to size or shape and assembling them as desired. Thus great versatility can be had from basic stocks of components in a pre-packaged ready-for-use or polymerizable condition by my invention.

In FIGURE 12 a printed or colored feature which is shown in this case as a circle and butterfly arrangement (or even made of natural preserved butterflies) are superimposed on a metallic thread filigree, aluminum strips, metallized Mylar as shown or in any suitable requirements of the design. Underlying the filigree feature 42, the core 10 can be laminated with a corundum flecked colored marble-like layer 25 which is seen through a pellucid layer 22. I have found that placing a fiber glass surfacing mat in layer 22 over all the features in the pellucid resin of the layer provides a strong surface construction and retains the respective features in their respective planes in place when in final polymerized condition. When the features are individually packaged like 5 in polyethylene film or the like in function, pattern arrangement can be made in each separate table unit so that non-uniformity in pattern can provide interest. The filigree in a laminated layer-ready-for-polymerization 42 can be mass produced in rolls so that a laminator can cut off portions to meet specific aesthetic designs. As in the other figures shown, the core 10 can be provided as a separate element or it can be provided as a part of an entire packaged construction in a polymerizable state so that the various features shown when polymerized make up a unitary structure. The envelope 3 referred in FIGURE 11 as a packaging sheet resin film 3 is completed in any of the assembled constructions by covering the assembly with a top sheet of the same and sealing it or heat sealing it into a completed package.

FIGURE 13 shows another type of construction wherein preform elements 11 having perforated shaped holes 46 are provided for embedment in core 10 and over which a layer 25 is constructed as herein disclosed. The preform elements 11 can be made of a core-like material as a precast and ready for bonding to core 10 or the preform elements 11 can be core-like bodies laminated with sections cut from a layer 25 of varying color from the core covered by another colored layer 25 so that harmonizing but different colored particles of a marble-like nature will be features. Element 47 can represent a core-like body cast with holes 46 therein and the feature color of element 11 provided as a stamping cut from a layer 25 of a desired color. The whole assembly can be provided in packaged envelope construction 3 ready for polymerization into a unitary construction.

In FIGURE 14 the table-like construction is shown having a marble-like top in the manner of the present invention in which core 10 is covered with a lamination 25 for integration into a unitary structure. The top is shaped with rounded corners, as by a mold, and a border 55 of different colored aggregates from that of the main body of the top is provided by a strip cut from a layer 55 and fitted into place. A sculptured contour feature 43 on a metallized Mylar disk 44 which is bordered by a colored border 45, is provided in an enveloped-ready-for-polymerizing-condition as a preform of fiber glass mat and resin 21. Over the layer as the top exterior as a component of layer 25, layer 22 is applied to the mold as a clear transparent type of polymerizable resin at the same time of the integration of the construction in the manner of the present invention.

The features shown in FIGURES 11–14 are indicative of the great many different combinations of aesthetic decorative elements I provide in the present invention wherein decorative-structural constructions are manufactured as articles of manufacture at one and the same time. Prestressed preloaded constructions of an infinite variety are provided herein and the examples given are merely as indicated illustrations of the versatility of my invention.

In FIGURE 15 I show the features of one type of mold and for illustration only as a great many different molding features are available. In this case I show an aluminum casting with a highly polished surface 51 on its body 50 in which heating elements 19 are disposed in convenient spacing to provide uniform heat or the type of heat desired to the mold. Feature element 43 shows a section through a low relief pattern like that shown in FIGURE 14 as 43 provided in the mold face as a part thereof. When surfacing construction layer 22 is applied as herein explained and claimed is provided of a clear transparent resin layer and reinforced by a backed up layer of 0.10 fiber glass surfacing mat and gelled to a "B" stage as the term is used in the plastics industry, the mold in this case is now ready for the completion of a construction as shown in section in FIGURE 16.

In FIGURE 16 the mold 50 supported on its bed plate 54 and fastened thereto by holding bolts 53 is heated to the required molding temperature which in the case of certain polyester resins 21 is about 250° F. Having been kept below this temperature in this example while layer 22 was provided on the mold's polished surface 51, the gelled resin of layer 22 is sufficiently solid that the application of the successive layers will not harm the finish it has from the polished mold face 51. A sufficient quantity of resin 21 is placed in the mold, enough to form a firm thick layer between 22 and core 10 and enough also to extend into the pores and interstices of the core 10 to provide a structural laminated prestressed preloaded construction when in combination with core 10 and the reinforcement of fiber glass strands 7 and 2 in the disclosed manner of my invention. The permeation and penetration can be substantial, of depth, and even clear through the core 10 as shown at 21a. I have observed plastic resin propelled through a core-like body two inches thick in about one and one-half minutes. Such a column of resin in the body when it shrinks in the polymerizing reaction it goes through can shrink if in a free unbound state about 6% to 7% or even more at will of designer.

This penetration and permeation is directly related to the porosity and internal structure of the core and I design specific features in the core 10 mix designs in any useful core material of the invention. These features are most important in the way the prestressed preload is applied by the physio-chemical forces I use in the combination of materials and features of structural engineering of my art. Generally several physical and chemical features of the materials I use which are in and of the materials when I get them are considered in the design of the properties sought in any specific construction of this invention. I have found in the use of polyester plastic resins, e.g., that any single resin as furnished by a manufacturer usually does not provide the properties I find advantageously applied. I find that combining rigid type with flexible type resins, by adding vinyl toluene or styrene in discrete amounts, of adding lubricants, thixotropic materials like Cab-O-Sil, various catalysts, or by providing curing cycles best suited to my inventions I provide the balanced designed construction sought. The materials handle differently even when of the same mix design in different relative humidities and temperatures and care must be taken in manufacture, especially in the making, for example, by mixing to desired properties for use in a laminating press, and by storing formulations and "preforms" in cooled rooms at temperatures of about 40° F. the useful "pot-life," i.e., the useful workable condition in ready-for-use state for when the resinous materials of the "preform" or "formulation" is desired polymerized, low temperature substantially below ambient, assures a minimum waste of semi-processed ready-for-use components.

When plant mixes are used as manufactured as in devices of continuous type resin and catalyst feeding devices, generally large volumes of material should be processed in the interest of economics. My invention in whole or in part can be done in this manner, which as is obvious, can eliminate by controlled automation machinery some of the problems incident to environment.

FIGURE 16 also shows as does FIGURE 15, a two part mold 50 and 53. The mold is assembled prior to use as shown and after a construction like a table top is completed the two parts are separated, the mold faces cleaned and mold release if required applied to make ready for the next molding operation. The mold shown is suitable for use in a pressure device like a press or the pressure can be only that of the materials. Pressure can be supplied by any known method, including hydraulic pressure devices, pneumatic devices, vacuum or dead load applied.

In my research in core materials I have found very strong light weight cores can be made by utilizing the properties of fibrous glass wherein the spring features of glass play an important part. Fiber glass mats in various thicknesses when stabilized by compressive loadings applied about 10 to 15 times retain the spring much as like does metal when the loading subsequently applied in almost infinite cycles is kept within the elastic limit of fiber glass which is about 3%, i.e., elongation before ultimate loading is reached. The layer of fibrous glass of many types including materials of specific glass properties useful in shielding rays, when covered with a thin resinous film can become the cores of cores for my use, i.e., the fibers themselves are held in position by the resin binder. Loose fiber of long length compacted to desirable densities but without binder provides some spring action also, but the resin binder type appears to be better for my purposes. Such a layer of fiber glass say for example, ¾" thick, is placed on a layer of sized expanded aggregates of a hard shell-like exterior type having a fired and expanded clay or shale of porous body inside the shell-like exterior, around which a layer of plastic resin of a plasticized nature like polyvinyl chloride or the like has previously been placed in polymerizable form, or a rubbery type polyester resin utilized, and if desired the upper side of the ¾" thick fiber glass layer can be covered with a like lamination of expanded clay particles and plastic resin, and the whole construction either polymerized to a finished core, or made into a preform and packaged in a ready-for-use condition and stored for future use.

The aggregates can be of any suitable mesh size, from below 200 mesh up to say 5/16" diameter particles. The thicker the section the larger can be the aggregates as long as a balanced designed mix is maintained as in a concrete mix so that a homogeneous structure of specific porosity characteristics results. The binder of say polyester resin with a known shrinkage characteristic of the order of say, 6% and with a not too rigid body provides prestressed preload forces into the construction of the core when it sets and cures in the final step in the manufacture of the article of manufacture.

By formulation techniques various densities of fiber glass or the like can be combined with selected densities and porosity characteristics of the resin-aggregate mix. Pumice, tufa, or aggregates of volcanic origin like volcanic glass expanded structures do exhibit low tensile strengths but nothing like the substantial tensile strengths that I get from the manufacture of "resin-crete." As a prestressed preloaded material bound with a strong yet resilient binder the material in itself, has "bounce" and is of light weight because of the light weight cellular shell-like covered aggregate components. By regulating the amounts of resin binder used I am able to provide a great many densities and pore characteristics in an improved manner. When I combine such a material combination with stabilized fiber glass I can provide resilient laminations of relatively low cost materials suitable for the articles of manufacture of the present invention.

In the next step in the manufacture of an article of manufacture like the chair and tables shown herein, the lamination of a layer 25 provides both additional structural values as well as decorative values. As preform material the core-like constructions just described are responsive to forming into flat sheet-like constructions as well as into compound curved constructions. When polymerized or fixed by any suitable means, constructions when formed are in a prestressed preloaded state in their use and are of an almost indestructible nature because of the inherent strengths provided usefully.

As a further improvement in the manufacture of core-like materials I have found that an expanded resin like an expanded polyester resin or those of the type herein above disclosed, when mixed into the core construction as the binder resin, i.e., as the cement-like constituent of the construction and when packaged in a ready-for-use laminated construction, upon polymerization between two surface constructions like layer 25, provide a very light weight core with improved properties in strength because of the prestressed preload in the structure provided by the expansion forces derived when the binder resin polymerizes and expands in combination reaction. In this case the forces of expansion rather than the forces of shrinkage provide the prestressed preload in the construction.

It is to be particularly noted the use of prestressed preload can refer to either tensile pre-tensioning of a material or compression stressing of a material or a combination of force systems providing prestressed preload in the construction or constituent parts thereof. Captured forces placed in materials not inherent to their static loaded state comprise prestressed preload as defined in the present invention.

The packaging improvement provided herein makes possible the use of materials whose inherent characteristics in the hands of the unskilled makes them hazardous. Such a material is a resin system comprised of isocyanate-polyester or di-isocyanate-polyester resins. The protection of enclosure is required in the use of such materials. Research is in progress which may change such materials as have a short storage life characteristic and also give them improved features in use.

I have improved upon the results of the two component systems of the type of these resins by the packaging means and method used. A component of the mix, like polyester resin is packaged in capsule-like packages, which, e.g., are soluble in specific solvents or when elevated temperature above ambient temperature is applied to the system of resin used, the solvent of the system can then dissolve the envelope of the package. Pressure or temperature generated in a component of the system as well as other means can be used.

Filled capsules can be further packaged into larger capsules or enclosures. Capsules or enclosed bodies of polyester resin are placed into capsules or enclosures containing isocyanate or di-isocyanate material so that the two components of the system are in close proximity but are separated. They are in this condition ready-for-use packaged components allowing their use in a convenient manner at a convenient time. The commingling of the two materials can be brought about by pressure, heat or solvent action, or in fact any known means, wherein the envelopes or enclosures are opened. Since in this example the resins are water-sensitive, water-tight envelopes should be used for storage of prepared capsules.

As one example among many possible useful resin combinations, elastomers and elastomeric foams can be made by combining naphthalene di-isocyanates with glycol-adipic acid polyesters to lengthen the molecular chains formed in the linkage and then cross-linking the modified polyester by reaction with water, or glycols, or amine alcohols or diamines. Many variations through controlled chemical reactions are obtainable such as cross-linking by determining the active chemical endings in the modified polyester and reacting them with a predetermined amount of additional di-isocyanate. When glycol or diamine cross-linking elements are added in controlled small amounts the formation of carbon dioxide gas ($CO_2$) can be controlled or stopped.

Packaging envelopes for the capsules or enclosures can be of a material which is slowly soluble in water which in the form of liquid water or vapor water when reaching the ready-for-use packaged polyester-di-isocyanates completes the reaction in which $CO_2$ is evolved thus providing the expansion characteristics required in any designed reaction. The energy thus obtained provides in the present invention forces useful in prestressing into the constructions made, desired prestressed preloaded forces.

The packaging means overcomes some of the objections found in the production of products in which such resin types are useful and does provide polymerizable ready-for-use packaged materials so that the unskilled can use them with safety and in constructions that are most new and novel.

The combination of such resin systems with filler systems like the expanded fired clay or expanded fired shale bodies I use makes use of the force characteristics and features over a wide range of structural engineering concept and in the present invention I am stressing the use of these force features and characteristics in improving core-like bodies integrated and laminated to and with high strength surface construction laminations. Captured forces as prestressed preloaded forces in and of the materials of the invention make possible very high strength structures of light weight.

The fibers used aid materially in containment of the desired forces by providing tensile and flexure characteristics when used in combination with the plastic resins which hold and fix and provide force characteristics. Other strengths are likewise improved upon and balanced designed constructions are made much more easily than with conventional concepts. Specific strengths in portions of a construction can be obtained so that the total construction can be much more efficient.

The packaging of the two-component systems wherein reinforcement by the plastic resins is provided by their inherent strengths is improved upon in the case of water-sensitive resins as the watertight packaging insures designed integrity of a structural load bearing design which is to be provided by the plastic resins when they are polymerized or in other ways chemically set.

In my Patent No. 2,951,001 I disclose the use of melamine coated fiber glass like Owens-Corning Fiberglas Corporation's treatment #218 used as reinforcement in a layer 25 in that portion viewed from the surface and seen through a clear transparent or pellucid layer 22. This feature is most beneficial in any of my constructions where its use is desired. I have improved upon this feature in the present invention by combining dispersed aggregates whose crystal habit and character as shown in layer 24 provide reflective light features which appear for variations occurring in light sources and which hide scratches and surface marks in my constructions of the present invention. When combined with Fiberglas treatment #218 articles of manufacture of the present invention can be given much abuse before scratched surfaces are greatly noticed. The use of household wax like Johnson's Wax products appears to blend out and clean up scratched surfaces. I find it particularly beneficial in marble-like surfaces of the present invention in providing a wearing surface which when soiled can be washed off and the original surface kept in a good state of sheen or lustre. The marble-like aggregates when exposed at the surface of layer 22 provide still another type of decorative feature that I have found especially liked by architects and decorative minded persons like decorators. To many, high sheen, smoothness, and gloss effects of surfaces are less attractive than soft textured effects of surfaces. By omitting layer 22 in its entire application, or applying layer 21 upon layer 22 before it has gelled in spots, or in its entire layer, entrained air leaves pockets in the surface, or the heavier bodied filler components settle to the surface and are exposed, or about exposed, which combination of effects provides an irregular surface effect which breaks up light and gives a soft textured appearance to the construction. At times I deliberately use heavier particles to settle to the face of the layer 22, which particles like black corundum of say 30 or 60 mesh screen size has facets which reflect light so that the finish has a sparkle and clarity of definition between areas of lesser sheen and the corundum particles. The distance back into the layer 22 or layer 21 that the varied colored particles are disposed is a feature that provides many design possibilities and like in the setting of a diamond, the setting of the diamond can add to or take from its features. The clear transparent layer 22 or lack of it, or the pellucid layer 22 over varying depth located particles all contribute to the great beauty I get in my invented articles of manufacture.

The ability to make articles of manufacture of the invention which have non-burning or self-extinguishing characteristics is a most important provision of the invented articles. I provide these features in the present invention by providing constructions which have been exposed to 1200° F. in a test oven for a period of five or more minutes and during which time the surface or body of the construction did not burst out into flame. The resin components of the construction did char out in part or in whole of the surface of the test sample but no flame appeared. The test was made in an A.S.T.M. approved laboratory by their personnel. I attribute the successful test to my use of Plaskon PE–13 resin, a resin forming composition containing alkyd type polyester of chlorinated dibasic acid and ethylene or propylene glycol, and a percentage of styrene monomer and is sold by the Barrett Division of the Allied Chemical and Dye Corp., New York, N.Y., with 5.7% antimony oxide added to the resin and to the use of crystals of $Al_2O_3$. The features of the various minerals I use that have proven most useful in making such constructions are of the order of hardness of 5 to 9 on Mohs' scale and are infusible and insoluble. Refractories are of many types and readily obtainable in forms suitable for my use. Quartz, tridymite and cristobalite when combined with $Al_2O_3$ of high heat resistance like andalusite ($Al_2O_3 \cdot SiO_2$) with a specific gravity of 3.1–3.2 are good for temperatures from 1000° F. to about 2300° F. and act as insulation when in plane of layer 22 and protective of layer 21. Plastic resins are not yet available for long use for over about 600° F. except the silicone resins and the like, but when compounded with Het resins, a resin forming polyester containing hexachloroendomethylene tetrahydrophthalic acid, like Hooker Electrochemical Company II–XII–I (92) resin and with antimony oxide are suitable for my uses and I have sustained concrete-plastic resin fiber glass constructions under heat loads of 1200° F. for five minutes without flaming. The rate of char can be controlled to a certain extent by the amount of filler used, its type and size of particle being taken into consideration. Very thin laminates above the surface of the core 10 also prove to be non-burning when the body is deeply penetrated with a self-extinguishing resin like Plaskon PE–13 or Hetron, a group of chlorinated unsaturated polyester resins manufactured by the Hooker Electro-Chemical Company of Niagara Falls, New York, wherein the fiber glass layer does not obstruct heat removal by the aggregates of the core. Also aluminum foil adjacent the surface layer 22 in a perforated sheet form discharges heat and makes for a non-burning construction. With no flame present except at the point of incidence of a fire, the features herewith are new and novel improvements in laminated constructions of the type of the present invention.

In the constructions just described I have found that I can protect structural load bearing features of the constructions like unidirectional fibers 7 and the deep penetrated and permeated portions of resin 21 as well as about fibers 7 by using and providing an insulation of relatively pure silica, like Fibrafrax, a chemically treated glass fiber. Heat treatment of virgin glass increases its density and the strength falls off with heat treatment. Fibers that have been heat treated when covered with plastic resin recover much of their strength. It is well to keep in mind that glass is a liquid reasonably stable to about 1,000° F., with quartz and related minerals melting at about 3000° F. Heat treating glass to stabilize it for its spring action is done at about 800° F. well below its melting point. While pure silica like Fibrafrax is heat insulative above 2,000° F. it finds its best use from 1600° F. to say 2100° F. depending upon how fast heat can be discharged from around it. Fiber glass thus protected, especially as prestressing fibers, finds good use in the present invention.

The manufacture of a laboratory table wherein the top surface must be precision ground to very fine tolerances is a very costly operation. By providing a master precision leveled casting mold in which to make a table like say FIGURE 1 or FIGURE 4 or FIGURE 6 and casting therein an epoxy resin fiber glass lamination 25 bonded and integrated with an epoxy resin with hardener pyromellitic dianhydride and bonded expanded clay aggregate core 10 the resultant table I make is of the order of the precision provided by the molding surface provided. In such a table when I want to protect the prestressed preload from heat in the construction provided by the resin 21 and the resin 22 I use a layer of heat treated glass of the nature of Fibrafrax or of heat treated high temperature insulation of other suitable type above or around the desired protected constructions. Fiber glass 7 can be protected by wrapping a pure silica tape of the type of Fibrafrax around the unidirectional fibers 7 to a thickness sufficient to insulate most of the fibers or all of the fibers 7 so that if a flame reaches the area adjacent to the fibers 7 their ability to work in tensile loading will not be impaired for a predetermined length of time. As in reinforced concrete structures steel is covered about 2″ with concrete as a fire protective measure, so in my constructions I have provided a means of fireproofing. In a table that is of such precision it is important to keep its prestressed preload uniform at all times and in the use of such a table which can be used where heat loads up to the capacity of the resin are loaded for long periods of time (in this case about 350° F. to 500° F.), the temperature rise above ambient temperature induces internal forces in the table and affects the relative strengths of the resin bonded fibers 7. Such insulation as here disclosed protects the fibers 7 against such heat imposed force effects. Obviously the disclosure just given can be used in many different constructions than herein given and no limitation is intended in providing insulated constructions as tapes, sleeving or jacketed composite constructions.

Although the embodiments and examples set forth herein are in part substantially identical with those given in companion cases covering related but different distinct inventions, it will be understood by those versed in patent law and practice that this is because these practical articles and methods embody several inventions, each or some of which can be used with or without the others, i.e., some of the inventions thus used together may be considered optional or can be replaced by alternatives.

The resin which I use depends upon the conditions to which the completed structure is subjected. There is much latitude for choice. If strength under high temperature is not essential and if expected tensile loading at higher temperatures is not in excess of the strength of the core and its non-plastic reinforcement, thermoplastic resins can be used. Soluble rigid resins which are not thermoplastic can be applied in solution and the solvent evaporated when adhesion and permeation and penetration have been established and thermosetting then accomplished as shown above.

Where the strength of the resin is relied upon for structural strength of the member, setting resins give important advantages for this purpose. I have found advantageously, for this purpose that the features of unsaturated polyesters cross-bonded with an active unsaturated monomer "vulcanizing" agent, such as vinyl toluene or styrene monomer, etc., can be used very satisfactorily.

Rigid plastics are most advantageous because they can bring their own tensile strength to bear in reinforcement of the porous structural material. More stretchable set plastics, like rubber, and especially the stiffer synthetic rubbers, although they may not of themselves afford much tensile support to the core material before it is stressed to its ultimate designed use strength, or to failure, nevertheless may be used to bond together particles of core material and also to bond reinforcing fibers such as polyethylene-terephthalate (Dacron), nylon, sisal or fiber glass to the core body.

Among the various resins I have thus far found most useful for this invention are the following, but obviously, because of the constant improvements in the manufacture of plastic resins, the following is not intended to limit the use of any resin or combination of resins coming into beneficial use within the scope and intent of the present invention:

Polyester resins
Modified polyester resins
Alkyd resins
Polyester resins containing triallyl cyanurate to give heat resistance
Polyester resins made from triallyl cyanurate and modified maleic alkyd
Polyester resins containing fireproofing additions such as antimony oxide and Chlorowax 70, a chlorinated wax having 70% chlorine available
Epoxide and epoxy resins
Phenol aldehyde resins
Amino aldehyde resins
Phenolic resins
Silicone resins
Polyurethane resins
Phenolic-epoxy resins
Epoxy-polysulfide resins (epoxy-Thiokol rubber)
Alkyd-silicone resins
Polyurethan foams and elastomeric resins
Shock resistant polyurethan-phenolic resins
Aromatic diisocyanates-polyester foamed elastomeric resins
Diisocyanate-dibasic polyester resins
Diisocyanate-trihydric alcohol polyester resins
Linear polyester from dihydric alcohols-diisocyanates resins
Elastomeric symmetrical aromatic diisocyanates-polyester-amides resins
Ethylene adipate polymers
Epoxy resins with aryl polyamine hardeners, such as M-phenylene diamine or methylene di-aniline
Epoxy resins with anhydride hardeners, such as, Het-anhydride (300° F.–400° F.) or pyromellitic dianhydride (500° F. long time use at temperature)
Furane resins
Combinations as alloys of phenolic-epoxy, phenolic-furane, epoxy-furane resins which indicate high strength at 500° F. continuous use
Monochloro-trifluoroethylene resin
Vinyl resins
Polyvinyl chloride resin
Vinyl plastisol, plastigel or organosol resins Among the best thermoplastic resins for this invention there may be mentioned:

Vinyl resins
Poly tetra fluoro ethylene resins (Teflon)
Poly chloro tri fluoro ethylene resins (Kel–F)
Polyamide resins (nylon)
Polystyrene Among the rubber (elastomeric) resins useful as mentioned above are:

Buna, Perbunam, GRS, etc., butadiene polymers and copolymers, especially the stiff long chain cross-bonded resins
Pliofilm (rubber hydrochloride)
Neoprene (polymeric chloroprene)
Thiokol (polysulfide rubbers)

It is also advantageous to use compatible combinations of thermosetting and thermoplastic resins, e.g., for example melamine-nylon and phenolic-nylon combinations.

Advantageously, the properties of two resins like polyamide resin and epoxy resin can provide desirable features of both when combined with the polymide resin serving as both curing agent and modifier for the polyamide-epoxy resin mix.

The polyesters and polyester resins generally preferred in this invention are known in the art as unsaturated polyester resins and are made as linear condensation products from dibasic acids and glycols, but in part the dibasic acids are unsaturated. Fumaric and maleic acids are among several other materials used. The unsaturated polyesters are blended with a reactive monomer such as vinyl acetate, methyl methacrylate, vinyl toluene or styrene monomer. By the use of heat and/or a peroxide catalyst the mixture copolymerizes, with the monomer crosslinking the polyester to make a thermoset solid. The structure of epoxy resins are in most cases based upon epichlorohydrin and bisphenol-A. The commercial resins are generally mixtures of polymers wherein $n$ varies between 0 and 10, indicating molecular weight of 400 to approximately 8,000. These products contain both epoxide and hydroxyl groups capable of further reaction, such as phenolic and urea resins and polamines, as it is from the combination of these groups with polyfunctional reagents such as the phenolic and urea resins and polyamines that makes possible cured resin systems that are possessed of high strength and chemical resistance properties. Curing is accomplished by several means and mechanism, in the epoxide groups being cured by reaction with amino, carboxyl or hydroxyl groups and inorganic acids to give secondary hydroxyl groups and a bond from the remaining epoxide carbon atom to the nucleus of the donor. The secondary hydroxyl group undergoes typical reaction with acids and anhydrides. Various amines, acid anhydrides, dibasic acids, and resins including phenol-formaldehyde, urea-formaldehyde, polyamides, and melamine-formaldehyde are available as commercial curing agents. Since considerable development and research work is being done by the basic resin producers there is no intention of limiting this invention to existing materials as constant improvements are being made.

Combinations of compatible resins may be used, e.g., by assembling such resins respectively in several successive layers in the mold form or on the pallet and in the fiber and on and in the core body. Thus, one resin best suited for the purpose may be used for impregnating and adhesion to and in the core body to strengthen it and for bonding, prestressing and uniting the non-resinous core materials like the expanded fired clay particles in and of the core, to bond the fibrous materials of the decorative-structural layer 25 to the core while prestressing the core and adjacent layers like layer 22 and protecting and enclosing and bonding the fibrous material itself; another may be used to impregnate and adhere to the fiber glass and insulate the fibers from one another; a third may carry the filler and pigment for molding the face and giving it a selected and desired colored appearance; while still another may be used at the surface as does layer 22 at specific times and formulations as a hard glaze for wear and good appearance; and yet still another may be used as a binder and surfacing component to resist high temperatures as does silicone alkyd resin filled with aluminum pigment and which has temperature applications that range up to 1500° F. and which also may be used in outdoor chemical and refinery installations wherein fumes are encountered which erode lesser resistant materials. Work surfaces such as tables thus can be provided that are easier to maintain and are more permanent. A work table with a polytetra fluoro ethylene resins (Teflon) top and an impervious core as of this invention may be used where keeping surfaces clean are a problem because practically nothing sticks to Teflon in this use. Ordinarily, two or more different resins will be used, generally two or three, although frequently the compounding of the resin will be different for different layers. Thus, a monostyrene with suitable catalyst and with or without reinforcing pigment or diluent can be used in the core as an integral tensile reinforcement, while unsaturated polyester with styrene therein as a cross-linking vulcanizing agent is used in the fiber glass mat and for most of the thickness of the surface layer, and an alkyd resin is used at the surface to give a hard scratch-resistant finish. Epoxy resins make good surfaces for wear.

The resin used in my invention is advantageously fluid. It may be in various viscous states or may be a paste or powdered resin. The resin catalyst, such as benzoyl peroxide and other peroxides, persalts or hydroperoxides (Lupersol DDM etc.), and for epoxy resins, dicyandiamide or phenylene diamines, may also be liquid, paste or powder and may be incorporated directly into the resin in intimate mixture or can be in fusible or crushable capsules from which it is released or expelled by heat or pressure of the molding operation. While a great many different resins may be used in the present invention, not all resins can be used for a variety of reasons among which are economics, compatibility and inability to live successfully in a prestressed state or in the core material.

The ordinary principles of plastic compounding while used as regards fillers, pigments, extenders and other ingredients in the present invention have been substantially improved upon by my developments in using graded, sized and selected materials which respond to prestressing preloads in a manner of reliable and resilient constructions. The fillers thus used are many and varied. Some control shrinkage of plastic resins; some, especially large sized shell-like particles of weight or of light-weight expanded clays or bound silicas help in providing features of prestressing by the type of bond and size of the resin column between the particles; some extend the resins and improve properties while reducing cost; some impart toughness or other strength characteristics; some, like silica, impart surface hardness, texture and stone-like finish. Clays of various kinds impart smooth surface with controlled sheen and glare, or if fire clays, provide fire proofing qualities. The pulverized or granular rocks and minerals not only give beauty and various surface design effects, but many structural features and colors, textures and hardness.

Hereinabove, I have disclosed features about fillers that I have used, and generally, among the many fillers available in commercial sale are calcium carbonates, and especially as complex of calcium and minerals as found in natural minerals, and procurable in many screen sizes. In my invention lesser known or even unknown minerals as used in the instant invention, even though such minerals may have other beneficial uses, I have found that functional features as well as decorative-structural features are provided by the following minerals in the use I put them to in making embodiments of this invention. Among such minerals are clays, onyx chips and fines, commercially pure silica and silica as crushed rock minerals of a complex nature, pumice, obsidian chips and fines, ore minerals, quartz of many kinds like, e.g., white quartz, black quartz, amethyst-like quartz, garnet, smoky quartz, agate, rose quartz, chalcedony banded quartz, chert, jasper, flint, tourmaline, pyrope, alamadine spessarite, uvarivite, grossularite, andradite, norbergite, chondrodite, humite, clinohumite, dioptase, willemite, phenakite, olivine, chrysocolla, spodumene, dry mineral colors, heat treated silica, asbestos, corundum, aluminum particles from dust to chips, stainless steel grindings, and chips and dust of stainless steel, Carborundum particles, fibers of inorganic nature as pure silica fibers. Also organic fibers, wood flour, wood fibers, and the like as above disclosed, can be used. I have found very advantageous uses for expanded fire particles of clay and shale which have a shell-like enclosure over a very porous lightweight body.

These expanded fired clay-like particles I find to be amazingly strong and yet very light weight. In sizes from fines to $5/16''$ and even $3/4''$ diameter particles they form aggregate particles in a balanced design for material strucure with or without other fillers that I have found to be excellent in the cores of this invention. Resin binders with which I provide prestressing preloads have good anchorage for tensile stressing features in these clay-like particles and the material structure is more easily stress balanced. The fire expanded clays have a uniformity of compression resistance or tensile anchorage because of the uniform characteristics a material like clay fired at say 1990° F. to 2100° F. possesses. When used in my invented "resin-crete" high tensile resins provide amazingly strong structures but in the present invention while this property is not overlooked, the cores like core 10 which can be made of resin-crete can have a strong resilient body in a prestressed state that is a distinct improvement.

To more clearly explain this feature, when a rubber tire is inflated with a fluid like air, it can assume a rigidity of structure suitable for very substantial static loads. If it were desirable in this one property other material than rubber could be inflated with a fluid to carry static loads. However, rubber as natural rubber or as synthetic rubber in any of its many forms and resiliency characteristics as a compounded material when used in a tire responds the best in common materials to the dynamic loading impacted upon a tire when loaded with a static load in use in motion. Every bounce and impact the tire receives is to a great extent absorbed and changed from dynamic energy to heat and the frame of a car or vehicle equipped with tires takes only a small portion of the dynamic loading. The air in the tire provides a cushion to absorb shock, the best so far devised. Rubber by its elastic nature encloses the air volume under pressure and to any reasonable degree of adjustment we can inflate or deflate the air volume in the tire so that the degree of resiliency we want is provided.

While the air volume in the tire is under pressure above atmospheric pressure the fibrous cords of reinforcement common to a tire and the rubber binder and resiilent rubber tread section of the tire are in a prestressed preloaded state. The greater the inside pressure within the factor of safe inflation, the larger the static load we can carry, but within limits, the greater the pressure in the tire, the harder is its response to dynamic loading. For the greatest comfort we do not use hard rubber tires any more, nor do we inflate to excessive pressures. We find the comfortable range of pressure which prestresses the rubber and fabric of a tire for its best use.

I have found that when I use expanded clay particles having a shell-like encasement over an expanded air or gas filled core that I have a particle or body which if surrounded with a plastic resin which has the degree of rigidity or flexibility or combination thereof I use in specific constructions, I have a combination of features that work as does a tire, especially when a plurality of such particles is a layer of a lamination like core 10, and more especially when such a resin-crete core is covered with a reinforced plastic resin fiber glass layer like layer 25. The resin 21 of the layer 25 may prestress the core 10 as above explained during lamination in final assembly or the resin binder used as the cement which unites the clay particles may provide prestress preload into the core 10 before said lamination of layer 25 into the final integrated structure. The sized and graded clay particles provide excellent compression resistant material. The binder resin advantageously has shrinkage and is of a resilient rubbery nature to specific designed characteristics, and surprisingly, to very accurate repeatable stress-strain characteristics.

The tensile reinforcement of a plastic resin like a conventional Hetron 92 polyester resin can be 5900 p.s.i. at 73° F. with a tensile modulus of $0.43 \times 10^6$ p.s.i. and with a crushing strength of 21,200 p.s.i. at 73° F. Its crushing strength at 73° F. after 7 days at 392° F. is 19,300 p.s.i. with a weight loss of 2%. After 30 days at 392° F. the weight loss is 15%. Such a resin has an elongation in an unmodified state of 2.4% and a Barcol hardness of 55. It is self-extinguishing.

The combination of hermetically sealed aggregates which are practically inert with plastic resin which can be provided in many gradations of resiliency from rigid to flexible, provides a construction which to designed characteristics can be bounced and bumped and abused as almost no other material.

When I use material graded and separated by screening I find that one type available to me weights about 41 lbs. per cu. ft. for that passing the 1″ screen, about 44.7 lbs. per cu. ft. for that passing the 9/16″ screen, about 57 lbs. for that passing 3/8″ screen, and about 62.5 lbs. for that passing a No. 8 screen, the said particles in a dry condition and not packed.

Because of its calcined nature it is particularly useful as it is chemically inert. The chemical properties of the aggregates approximately the following percentages:

| | Percent |
|---|---|
| Silica, $SiO_2$ | 61.85 |
| $Al_2O_3$, alumina | 23.57 |
| CaO, calcium oxide | 2.60 |
| MgO, magnesia | 2.80 |
| $Fe_2O_3$, ferric oxide | 2.90 |
| $Na_2O$, sodium oxide | 3.90 |
| $K_2O$, potassium oxide | 1.63 |
| $SO_3$, sulfur trioxide | Trace |
| Loss in ignition | .40 |

The exact characteristics given are not the critical feature of the invention but a particle having a hard shell containing an expanded light weight body is most advantageous and preferred. Natural volcanic material has proven useful but does not come up to the needs of some structures because the shell is either absent or the material is crushed by the volcanic action producing it or is of an open porous structure. In very light weight constructions the shell enclosed particle has a larger amount of voids unless I intentionally create voids by the nature of the mixing process of resin and aggregates. The hard shell provides much strength to the construction as primary reinforcement in compression. I do not fill up voids in the particles when they have a shell and thus can determine more accurately the voids remaining between particles when I design aggregate mixes. The overall porosity of the material must be evaluated for the combining of the plastic resins. Ratios arbitrarily ascertained in any local material may not provide the structure sought. By sampling, curing the mix, and subjecting it to compression, tensile, shear and torsion tests, formulations for mass production of core material can be provided.

An expanded aggregate can be provided which on test had a fineness modulus of from 7.41 to 2.90 for aggregates (1″ x 9/16″ to 8M x 10) as an average of five analyses. Its specific gravity (bulk—S.S.D.) for aggregates (1″ x 9/16″ to 8M x 0) is from 1.08 for 1″ x 9/16″, 1.32 for 9/16″ x 5/16″, 1.51 for 5/16″ x 8M, to 1.91 for 8M x 0. Its absorption—percent of dry weight (Sat-S. Dry Weight) at (in the four sizes given):

| | | | | |
|---|---|---|---|---|
| ½ hour | 3.8 | 4.2 | 5.9 | 14.1 |
| 1 hour | 4.4 | 4.8 | 6.5 | 15.6 |
| 1½ hour | 7.3 | 7.7 | 9.5 | 17.3 |

Balanced materials design compares favorably as regards specific gravity of such an aggregate as a plastic filler wherein a resin like Plaskon PE-13 has a specific gravity of 1.33 unfilled and "E" in flexure $0.62 \times 10^6$ p.s.i. and flexural strength, ultimate of 14,200 p.s.i. which when cured 5 min. at 235° F. with 3 plies of 2 oz. chrome finished glass fiber mat between metal platens at a pressure of 0–15 p.s.i. provides a laminated structure whose ultimate flexural strength is 31,400 p.s.i. and whose modulus of elasticity is $1.38 \times 10^6$ p.s.i. A column of resin between particles of such aggregate or the like, with a tensile strength of the order of the resin and in a prestressed state makes a very strong construction of the combination. The aggregate has excellent bonding characteristics and the material responds, i.e., the combination of materials respond as does a homogenous material when its materials design is in a balanced design state. When the advantageous use of fibrous materials is employed as further reinforcement in a prestressed state one is amazed at the lightweight structure of resilient properties and high strength that results.

As disclosed and claimed above plastic resins which provide expansion can be employed in the manufacture of core-like materials 10. I find that by making a lamination of expanded fired clay particles and foam type resin in an envelope as a preformed ready for polymerization lamination, and at the time of final manufacture covering the core 10 with fibrous glass unidirectional and multi-directional fibers in structural load bearing assembly as in a layer 25 and at the same time providing aesthetic marble-like particles of color and wearing qualities, e.g., in a layer 22 to form the exterior face of the construction, when I place the assembly in a mold and cure it as a polymerized construction in a prestressed state, I have in one finishing operation built a structure as a load bearing and other structurally functioning construction and with most of the materials used, also provide aesthetic, pleasing useful constructions at a low cost of manufacture and in the minimum of time. The constructions can be used at once and I have completed such a construction from start to finish in thirty minutes, ready for shipment.

If I am using vinyl resin in such a construction, a plastigel or plastisol makes an excellent core resin. Vinyl chloride plastisol containing a chemical blowing agent like Du Pont's BL-33 (Foam King, Inc. of Bronx 60, N.Y.) has such a material used in their licensed process. By using vinyl chloride and Du Pont's BL-33 or any other of known blowing agents and confining the core lamination of the type just described above herein between two laminations like layer 25 which in this case have both unidirectional and multi-directional fiber glass in equal amounts, and in which the unidirectional fiber glass is provided in belt-like constructions of my invention with prepared end anchorages ready for use in a prepackaged construction, and in which the fiber glass strands are covered with polyvinyl chloride of a tough, strong nature in a form ready for curing, and when I place the whole construction under pressure of say 100 p.s.i. or that pressure which provides the desired resistance for the expansion forces of the blowing agent, and at the same time inducing by mechanical means the desired prestress preload into the fiber glass unidirectional mat construction, and which is held in a prestressed preload during the cure, and when I place the assembled materials in a curing oven at 350° F. and allow the construction to cure I take out of the oven a table top, or in fact any article of manufacture in a shape or form or contour that I have designed in a time cycle peculiar to the curing characteristics of the resin or resins used. Epoxy resin in combination with elastomeric resin can be handled similarly taking into consideration curing properties of the resin. Polyester resins that have desired shrinkage for the prestressing component can be used and the mechanical prestressing operation omitted in the sequence of construction, reliance for prestressing preload being upon the physio-chemical forces induced as prestressed preload. The resin structure, the core filler of expanded fired clay or the like, the fibers or fiber glass reinforcement and in fact all the materials of the combination are considered as one does materials of construction for their tensile, compression, shear and torsion qualities and used in the manner of the art of structural engineering, which is an art and not a science.

In articles of manufacture of the present invention wherein it is desirable to protect the fibrous reinforcement against heat of substantial amounts for definite periods of time, I have found that expanded fired clay or shale particles used on the exterior surface in a bonded construction of various thicknesses as designed in relation to the heat load protect the integrity of the reinforcement adequately, even if when covered with a resin layer 22, and the resin burns off.

In the manufacture of sculptured or relief features as is shown in FIGURE 14 the cost of aluminium molds is frequently excessive for when the quantity of individual pieces required is small. In this case I use a core 10 laminated with an epoxy resin fiber glass construction but I have found that my improvement in its manufacture provides a much improved molding. The core 10 that I use is a multi-lamination of core body reinforcements and cores 10. The density of each lamination is carefully controlled so that in a five layer lamination, e.g., the first two inches is a core 10 of 3,000 p.s.i. in compression. On this core I laminate a layer of resin filled fiber glass consisting of three layers of 2 oz. Owens-Corning Treatment 219 or the like, the treatment of the glass not being critical in this particular embodiment, between which I place 20 sixty end rovings to each linear inch in each direction to provide tensile reinforcement. A surplus of resin like a mixture of Versamid 115 and Bakelite ERL 2795 in a 50%/50% mix is applied to the core layer and the glass mat and roving well covered by the resin. Upon this first layer I next place a core layer 10 made of a 2″ thick lamination of expanded fired clay bodies in sized mix as explained above and in which I use an epoxy-Thiokol binder so that the resultant core body is tough yet resilient to a greater extent than the epoxy-polyamide lamination of the joinery layer between the core bodies. The next lamination can be similar to the five layer reinforcement layer of unidirectional and multi-directional fiber over which I place another 2″ thick core layer 10 but which is still more resilient than the last, the binder being still more rubbery, i.e., extensible under impact. In the next layer of reinforcement I use polyethylene-terephthalate filaments (Dacron) for its property of elongation in tensile loading and for its providing a more resilient structure. Two layers of Dacron mat in between three layers of multidirectional fiber glass in a surplus of epoxy-polysulfide (Thiokol) resin integrates and bonds the core 10 below to a one inch thick core above which I make with still more resilient characteristics so that the pressure of a finger nail into its surface will only very slightly depress the material.

The amount of detail and its depth of cut in the master molding which I make of plaster for providing the features as molded or modeled like, e.g., like in element 43 of FIGURE 14 determines the thickness of the next core layer 10 but generally, the variation in such a low relief figure of my use varies from ⅛″ to ¼″. The core body 10 in which this is provided can be 2″ down to 1″ thick but it advantageously is of less provided porosity than the cores below. I find that the core will provide a fine resilient response to molding pressure and yet not distort detail. The lamination of reinforcement in this last bonded and integrated reinforcement construction can be like the last with Dacron and fiber glass providing tensile reinforcement. The resin layer in and about the fiber glass and Dacron can be the same as the previous layer.

With the several core layers 10 assembled the layer 25 is applied of a hard tough but resilient epoxy resin and fiber glass molding or caul face. At times I use Dacron with the fiber glass in this construction.

The feature of resilient resistance which the composite core 10 provides makes for many more times of use as well as for a fine true fidelity of reproduction of detail. When the core is in use under pressure in a press, force distribution is more even and approaches a fluid in energy transfer uniformity. Internal strains are relieved by the construction. When used in drop hammer work much or most of the rubber padding used can be dispensed with. Concrete and expanded clay bodies are inexpensive materials so that a fixture of this kind does not cost anywhere near as much as a metal mold. By using high heat resistant resins a tool like that shown in FIGURE 15 can be made with heating elements of any of several types, installed in its body. Obviously such a construction can be male or female, and used if desired, in sheet type press laminating constructions. I also find that precision type preforms of fibrous materials made with binder resins in a cured state can be advantageously made on such a construction.

Conveyorized production equipment having carrier films or belts provide means on moving conveyors of building up desired laminations of fibers and resins and filler ready to polymerize at a later sequence in the same conveyorized production line or, when desired similar equipment can be used to make laminations ready for future polymerization in a packaged state as elements of construction. Core constructions can be made with the same equipment by providing hopper feeds for the clay or shale expanded aggregates so they can be extruded when mixed with resin upon a carrier film component of an envelope which can be heat sealed. The core layer 10 can be used in a distant place from that of original manufacture in its unpolymerized state or at a different time at the original place of manufacture, i.e., be laminated to other laminations or cores in final manufacture in articles of manufacture as herein disclosed.

FIGURE 17 shows an isometric view of an element of construction having spaced holes in the body of the core-like materials 10 and particularly adapted to prestressing. The surface construction layer 25 advantageously is transparent or translucent so that fibrous reinforcement 56 is visible therethrough. Hole 55 serves an anchorage function wherein fibrous reinforcement 56 is pushed or inserted into the hole and continued out from the hole 55 so that continuity of reinforcement is not lost in the change of plane in which the reinforcement is disposed. The columns of plastic resin fiber reinforced material 57 integrated into and of the core-like body 10 make the construction of exceptional strength for its weight and provides strong resistance to impact-impulse loadings. The web effect of the placed fibrous reinforcement provides excellent shear wall construction. The impregnated and permeated plastic resin into the core-like body provides zones of added strength and such constructions are not limited in size or thickness. While the FIGURE 17 shows a transparent layer 25 I have used opaque layers 25 and in which the fibrous reinforcement does not appear visible. In this case I used polyester resin and unidirectional fiber glass for the reinforcement of the core which was resin bonded expanded fired clay particles.

FIGURE 18 shows an enlarged section through a portion of FIGURE 17. The fibrous reinforcement 56 is shown as a separate layer for illustrative purposes but in practice it is part of the layer 25 as a unitary construction.

FIGURE 19 shows a partial cross-section of two spaced apart core-like bodies reinforced as in FIGURES 17 and 18 but in which the fibrous reinforcement extends through two outer core-like bodies each prestressed and prestressed connected to each other by means of the fibrous reinforcement which is itself prestressed by the shrinkage of the plastic resins I use in this case. Such a light weight construction has many uses, such as insulation and moisture barriers, bulk-heads, enclosure members and fixture components. Because of the nature of the resilient constructions provided by the prestressing features of the invention by the forces induced by the shrinkage of the resin, the constructions made are amazingly strong for the weight.

FIGURE 20 shows a partial section of a core-like body packaged in a ready-for-use reinforced plastic integration and lamination, the body of which core-like material of capsule-like plastic resin pre-packaged reinforcements and expanded fired clay aggregates, or the like, upon activation of the plastic resin constitutents by a chemical reaction of conversion provides a unitary prestressed preloaded construction. Core-like body 10 can be a cement bound or resin bound aggregate composed of expanded fired clay aggregates and pre-packaged plastic resin capsule-like material 58 which can be contained in a preformed envelope construction 25 suitable for polymerization at a later time. The capsule-like prepared ready-for-polymerization material 58 can be a capsule covered element 59 made of a gelatin or plastic resin or the like, which can melt at a temperature below that of the polymerization temperature of the plastic resin in the capsule enclosure. The enclosed plastic resin can be in small units or it can be in substantial sized units and the combination of plastic resin and aggregate provided in a balanced design for specific structural purposes when the plastic resin is converted into its final solid state by, e.g., polymerization.

FIGURE 21 shows such bodies ready for polymerization in a Portland cement bound light-weight aggregate of expanded fired clay or shale and the plastic resin 58 units in place as aggregate, i.e., in the body 60.

FIGURE 21 shows pre-packaged partially completed constructions which can be mass produced and shipped so that even the unskilled can make uniform chemically controlled products. A skilled chemist in a central plant can supervise the making of mass production quantities and workman everywhere can complete the arranged and pre-packaged and packaged material and process the same into finished constructions. In core-like body 10 the capsule-like elements 58 in their enclosures 59 are ready for polymerization.

FIGURE 22 shows a section like that in FIGURE 21 in which the body 60 is laminated with a layer 25 containing decorative-structural elements of plastic resin, catalyst, discrete fillers and fiber reinforcement like say, fiber glass or polyethylene-terephthalate (Dacron) or acrylic fibers (Orlon). The outer face of laminated layer 25 can be acrylic type resin suitable for continued outdoor exposure while the reinforcing resin of the fiber glass laminate in the layer 25 can be a compatible polyester with a substantial shrinkage of say 5% to 7% when it is completely cured. The capsule-like enclosure can be made of polyethylene film of thin gauge and provided to release the plastic resin shown released as 61 and permeated and penetrated into the area of the core-like body adjacent thereto. A third resin, say a polyester or a styrene resin can be layered in the lamination next adjacent the core-like body and of a type that can penetrate and permeate the core-like body as shown at 62. The fibers 7 can be unidirectional strands subject to the chemical prestressing provided by the plastic resin as well as unidirectional strands made up into looped constructions and prestressed by mechanical means. The plastic resin reinforcement can be general throughout the core-like material 10 so that the resin 61 can be activated by heat or it can be placed in zones for strength and activated by pressure, decay of the enclosure film which releases a catalyst into the resin for plastic polymerization or any other suitable means. The combination of materials advantageously are engineered to specific uses and the many resin reinforcements and fibers available provide the invention with a great many opportunities for service. The current and probably greater need for skilled chemical engineers makes this invention of ready-for-use prepackaged and packaged constructions most useful because many men can follow directions on a package whereas only a few skilled chemists can supervise successful packages of construction in preparation.

FIGURE 23 shows a cross-section through a cable-like reinforcement of fibrous material, say like fiber glass or polyethylene-terephthalate (Dacron), wherein the fibrous reinforcement 66 is enclosed in a thin envelope 65 and surrounded in the envelope 65 by a suitable fluid, say like oil or water or silicone fluid, which fluid 64 is contained in an outer envelope 63 of substantial strength. The cable-like construction is used in a prestressed preloaded state in which the first prestressed preload is applied by fluid pressure built up by a pump or similar type means so that fluid 64 compresses the enveloped 65 fiber glass or the like fibers 66 to a desired state of compressive pressure after which the cable-like construction 66 is submitted to longitudinal prestressed preload prior to the activation of the plastic resin binder in the envelope 65 distributed throughout the resin and fiber glass strands 66 so that the fiber glass strands are mildly tensioned and thus able to better work together in a cooperative manner. When in this condition the polymerization reaction is allowed to proceed and the plastic resin and the fiber glass 66 converted into an irreversible polymerized reinforced plastic reinforcement. The compression exerted by the fluid 64 pressure insures that the forces generated by the shrinkage of the plastic resin in 66 provide the desired prestressed preload in the cable-like construction. By balancing the forces of preload in the construction desired balanced design is obtained. Fluid pressure is easily controllable. Maximum glass content can be had in such a cable and most of it working in its most efficient manner.

FIGURE 24 shows a cross-section through a belt-like or a substantial sized ready-for-use laminated layered materials construction having high strength fibrous reinforcement enclosed in a packaging envelope which is surrounded by a thick layer of expandable plastic resin or elastomeric compound and all enclosed in an outer plastic resin fiber reinforced envelope as a ready-for-use packaged construction suitable for pressure balanced prestressing. Polyester resin or other suitable resin and fiber glass or other suitable unidirectional fibers are assembled in element 71 which is enclosed in a thin envelope 70 in a pre-packaged condition. Enclosing envelope 70 and its contents a substantially thick layer of expandable plastic resin 68 is disposed and the whole assembly enclosed in an envelope 67 which is of substantial strength, at least greater than the compressive force to be exerted upon the material 71 in envelope 70. The expandable plastic 68 when activated into a chemical reaction contains porous areas 69 and the pressure exerted in the reaction is transmitted to compress the material in envelope 70, it being the weaker envelope. The restraint on the outward pressure is exerted by the high strength of the outer envelope 67. The resulting construction is compressively prestressed and ready for longitudinal prestressing by the activation of the catalyst system in the plastic resin in and about the unidirectional glass strands in 71. Chemical prestressing by this means is very efficient as expandable plastics are obtainable with reliable force characteristics as is plastic resin used in making fiber glass reinforcements like I make them. The type of construction shown in my Patent No. 2,671,158 can be utilized in cooperation with this feature of this invention and polymerization obtained by resistance heating devices in the lamination as a manufactured component thereof.

FIGURE 24 shows a construction which can be adapted to several uses. As a mat or mattress-like element the strong central element 71 can support any desired load as designed into the construction with the expanded core-like material 68 providing a resilient impact absorbing body. As a shock pad or shock resistant wall to a fixture two features stand out of major use in that the prestressed preload in the central element 71 provides substantial strength to carry loads, especially if the ends of the same are anchored and the construction is additionally mechanically prestressed. The resistance to impact by the material 68 can be a determined value derived from the nature of the expanded plastic used. Densities from say 4 lbs. to 50 lbs. per cu. ft. are examples in this regard. One use suggested is that of a diving board for swimming pools wherein the spring action and strength of the material 71 provides an excellent diving board and the surface construction layer 25 can have non-skid features provided by corundum filler at the surface of the lamination. The construction can be a single color or varied color construction as desired. The warm feel of the plastic resin surface such as is provided by polyester resins or polyvinyl chloride resins makes such a diving board comfortable to the touch.

As a housing for machinery subject to vibration or noise such a construction can have many uses and when provided in a packaged ready-for-use material is most useful. Such a member of a housing can be die stamped and cut into shape prior to its conversion into a finished member by polymerization or the like. It can be provided on reels or in flat packages ready-for-use. It can be cut to shape after its conversion to an irreversible solid or a thermoplastic solid. The wide choice of plastics and plastic resins and elastomers can provide selected features.

FIGURE 25 is an elevation of a pressure device for providing prestressed preloaded constructions of the invention by pressure balanced prestressing. The preloading with prestressed preloads of reinforcements shaped in compound curvature is provided by this device. Supported on a base 83 a base plate 82 supports a mold 76 made of any desirable material that can be easily cast into the configuration of curved or irregular surface that is desired. I have found that concrete, plaster, resin-bound-aggregates (resin-crete), serve in many uses. Aluminum, kirksite and steel of course can be used by the molder. A face 90 is provided on the element 76 of the desired characteristics such as smoothness, figured pattern, mat face, etc. Epoxy resins filled with metallic powders like aluminum make excellent molds in this use. A preferred mold as hereinabove described is comprised of laminated constructions and provides surface features of great beauty and exactness of detail.

The upper portion 76a is provided with a surface lamination 91 similar to lamination 90 which laminations if desired can carry resistance wire heating elements or the mold body provided with known heating means. The casting 76a is secured to plate or member 75 which in turn is secured to member 74 which supports a hydraulic jack or similar device by which to raise and lower the upper section of the mold. In this case the hydraulic jack is provided with a resisting construction 72 for limiting its movement. On the right hand side of the device a resisting bulk-head 89 is provided supporting hydraulic jack 87 which is also supported by guide member 88. Guide member 88 has a slotted opening or other holding means 86 in which enlargement 85 of a cable-like construction as is shown in FIGURE 23 or a belt-like construction as is shown in FIGURE 24 or as shown in FIGURE 26 is secured in slotted opening or the like, 86. The member 79 comprising a pre-packaged unpolymerized construction as described in FIGURES 23, 24 and 26 thus anchored at 86 by enlargement thereof 85 is placed in the mold and on the left hand side of the mold is secured in anchorage device 80 by means of enlargement 81. On top of member 79 an expansion device 77 is placed and the same connected to a source of fluid pressure at 78.

To obtain a construction provided with pressure balanced prestressing, fluid pressure is admitted to member 77 which compresses member 79 against the mold. The fibrous reinforcement such as polyethylene-terephthalate (Dacron) or fiber glass strands is compacted and the strands aligned tightly in their resinous mass which protects them and covers them. The fluid pressure can be adjusted to the exact desired pressure to make the conforming shape of the mold.

At this point hydraulic jack 87 is actuated to push on member 76 of the mold body so that the fibers in 79 are straightened and aligned with just a slight amount of tension on them. The hydraulic jack 84 is actuated and by means of a gauge 101 pressure of a desired amount is applied to the fibrous strands in the member 79 providing longitudinal prestressing with a pressure feature of prestressed preload of known amount. When in this condition the polymerization reaction is actuated by heat or by the pressure provided by member 77 which breaks open internally placed catalyst which is in the resin mixture. Such a molding device can be made up from common shop components and suited to the variations of shape and size of the finished product. Since relatively low pressures are employed reliance for molding pressure can be placed on member 78. Products made on this device are relatively free from internal strains which would tend to warp or distort the product when released from the mold. Control over prestressed preload to provide balanced prestressing features of the constructions insures standardized results from similar mass produced products of the invention.

FIGURE 26 shows an isometric view of a portion of a cable-like construction of the type shown in FIGURE 23. Unidirectional fibers such as fiber glass are prepackaged in a plastic envelope or other suitable enclosure as shown at 95. A fluid space 94 is provided inside of an outer envelope 93 whose wall thickness 92 is of substantial strength in excess of the pressure to be applied to the fluid or by the fluid. Valve 100 provides for admission of pressure means through port 99 in the wall 92 of envelope 93. A looped construction 97 is provided in the construction of the fibrous reinforcement 95 having a hole 98 for anchorage in a device similar to 80 in FIGURE 25. The wall 92 of the envelope 93 is constricted at 96 around the fibrous reinforcement 95 to seal the end of the envelope to enable it to retain fluid under pressure. Obviously, various other types of anchorage construction can be used but they should have sufficient strength to enable the fibrous material to be prestressed preloaded to designed preloads.

At times it is convenient to cure by polymerization techniques such a reinforcement inside of a construction or fixture or frame in which the benefits of balanced prestressed preloads are required of the reinforcement. The member or construction can be fed into such an inaccessible place as is an electric cable in an underground conduit. The prestressing of the construction can be carried out as described herein and the final polymerization of the construction into an irreversible reinforced plastic laminated member can be done by a heated fluid pumped into fluid space 94 to actuate the polymerization reaction and to cure the plastic in the construction. Such a construction can be used to reinforce buried pipe lines, conduits or in fact any relatively permanent inaccessible or not to be moved existing construction.

The construction of FIGURES 23, 24 and 26 by the means of FIGURE 25 in combination with the features of the core-like materials 10 of the invention of which expanded fired clay or shale particles are preferred for substantial prestressed preloads provides light-weight prestressed constructions of very substantial strengths. The maximum benefits of the tensile characteristics of fibers such as fiber glass are derived from the products made. The light weight imparted to the constructions by the inert expanded fired clays and shales and plastic binders used makes the constructions practical and useful in quickly made products which can be made by relatively unskilled persons anywhere.

The features of my invention herein disclosed are useful in many constructions and when carried out variations which may occur in the materials used or in operating techniques of the men who perform the steps of production, may affect the curing time or the handling characteristics of the combination of materials so that, e.g., compensating changes in the viscosity of the resin mix may be required for best production cycles. The resin mix may be thinned by, e.g., adding styrene monomer in discrete amounts if polyester resins are being used. Curing temperature may be changed upward or downward to affect characteristics of the cure. Relations to ambient temperatures and humidity may require slight adjustments in the prepackaged mixes for any given location or locality.

At times I have found that dust in excess on the expanded clay or shale aggregates seems to hold back penetration and permeation of certain polyester resins in the controlled viscosities used. By dipping the expanded clay or shale particles in a strainer or colander type of vessel into a container of synthetic resin of thin viscosity or into styrene monomer, I seem to get much better results if I use such dipped particles after most of the resin or styrene monomer drains off but I must use them before the solvent characteristics of the dip are evaporated or lost.

The features of this invention which make possible many marble-like or stone-like features including specific physical and chemical features from sized aggregate type fillers of natural beauty in themselves, and when in my use, of extraordinary beauty because of the enhanced features of "sheen," "brilliance," etc., that the covering of plastic resin like the acrylic type resins provide are most novel and new. Of course, no limitation in this regard is placed on any other resin or substance which can do the decorative and structural features as herein shown. The use of papers made from various synthetic fibers such as polyethylene-terephthalate (Dacron) or acrylic fibers (Orlon) or the like, provide surface characteristics when made a part of layer 25 and laminated in a compatible resin mix. Their toughness in some instances makes the constructions much more resistant to abrasion and provides other specific features peculiar to each fiber.

The resulting constructions as articles of manufacture have "bounce" and can take unbelievable abuse in their various uses because of the balanced designed resilient constructions and the best use of the properties of the compression resistant materials in designed relationship to the best use of the properties of tensile strength in the materials. Controlled prestressed preload by internal tensions or prestressed preload obtained by external compressive or tensile loading and "frozen" and captured into the constructions provides articles of manufacture with great strength with the same materials that provide them with beauty and useful surface and structural constructions, and in many resistant features of constructions, both physical and chemical.

The terms of description and the expressions used which I have employed are used as terms of teaching description and not of limitation, and I have no intention in the use of such terms and expressions, of excluding any equivalents of the features shown and described or portions thereof, but recognize that various modifications are possible within the scope of the invention claimed.

I claim:
1. A prestressed preloaded article of manufacture comprising a core of porous material strengthened by a first plastic resin surface structure integrated with and bonded to said core, and fibrous material disposed in a second plastic resin surface structure providing unidirectional and multidirectional reinforcement, said core comprising a light-weight, high strength, impact resistant, resin-bonded core of porous structural material having an-open-to-the-surface connected-cellular material strengthened by the prestressed-preloaded first plastic resin composition binding said material together in a state of internal stress adapted to increase the strength and resiliency of said material and said core being integrated and bonded through said second resin in a unitary composite structure to a prestressed preloaded fibrous material disposed in said second plastic resin, said impact resistant core having a density of not over 50 pounds per cu. ft. and said article of manufacture existing in a prestressed state by the shrinkage forces provided by the polymerization of said plastic resins at the time of manufacture of said article of manufacture.

2. An article as defined in claim 1 wherein said second plastic resin includes marble-like features of color, pattern and texture provided by colored particles of minerals of crystal characteristics and habit, said minerals having a hardness thereof as measured on Mohs' scale of about 4 to 9.

3. An article as defined in claim 1 in which the fibrous material is selected from the group consisting of fiber glass strands and polyethylene-terephthalate strands.

4. An article as defined in claim 1 wherein the fibrous material is fiber glass strands.

5. An article as defined in claim 4 wherein a filler comprised of silicates is incorporated in said second plastic resin.

6. An article as defined in claim 1 wherein the strengthened core is further strengthened by said second plastic resin which extends into the pores and interstices of the core.

7. A prestressed preloaded article of furniture as in claim 6 comprising an article of furniture in which said prestressed preloaded core comprises a resin-bound-fire-expanded aggregate selected from the group consisting of shale and clay aggregate and an internally stressed resin.

8. An article as defined in claim 7 wherein a decorative material selected from the group consisting of quartz, jasper, tourmaline, agate and garnet is incorporated in said second plastic resin.

9. A method of making an abuse resistant article of manufacture comprising a table having a precision plane surface as a feature together with decorative-structural sculptured appearing embellishments provided with exposed to view integral filigree features in a decorative-structural fiber reinforced plastic resin laminated construction; the step of providing a precision leveled planar faced mold having the configuration of said table, placing in this mold a clear optically transparent polymeric resin sheet adapted to provide lense-like clarity embellishment and magnification of features beneath and exposed to view, next, placing a resin-bound fire expanded clay aggregate core-like body having on one face thereof a discrete layer of fiber glass reinforced quartz crystals of varied color surrounding integral filigree embodiments, said fiber glass being strands embedded in polymeric resin composition acting in support of said crystals positioning said crystals in sculptured appearing embellishments, and said layer being disposed with the said crystals and filigree features next adjacent said clear optically transparent polymeric resin, apply discrete pressure to consolidate the said materials and set on a heated platen press and cure said materials under a constant pressure into the shape of said table.

10. A method of making an abuse resistant article of manufacture by providing a porous core construction comprising a porous fire expanded mineral aggregate which is bound together by at least a partially polymerized foam type plastic resin; encasing said core construction in a plastic resin-fiber glass construction; enclosing said core construction and said plastic resin construction in a decorative-structural surface construction comprising fiber glass and discrete colored mineral particles embedded in a clear gelled plastic resin; next packaging and sealing the thus enclosed materials in a solid plastic film; then placing said packaged materials in a mold and heating the packaged materials under pressure so as to cure said gelled resin and produce a laminate of unitary construction.

11. A method as in claim 10 wherein the fire expanded mineral is shale aggregate.

12. A method as in claim 10 wherein the fire expanded mineral aggregate is clay aggregate.

13. A method of making a chair body having a seat and supporting back comprising the steps of providing a single package ready-for-use, a gelled polymeric resin, a catalyst system therefor, a decorative filler and fibrous reinforcements, enclosed in a package wrapper of plastic resin; providing a preformed resin-bound porous core where the resin is an epoxy resin composition; first placing said core and then said packaged materials in a mold having the configuration of said chair body, heating under pressure to cure and laminate said materials into the shape of said chair body and removing the formed chair body from the mold.

14. A method as defined in claim 13 in which said porous core material is selected from the group consisting of fire expanded shale aggregate, fire expanded clay aggregate, vermiculite, perlite and pumice.

15. The method of making an abuse resistant article of furniture which comprises providing a plastic-resin-bonded core body of porous structural material and a packaged ready-for-use polymerizable laminating decorative-structural surface construction comprised of plastic resin composition having a filler therefor comprised of colored mineral particles, said plastic resin composition completely covering embedded fibrous reinforcement thereof, said minerals being placed adjacent the surface of said package under a body of clear transparent plastic resin for the decorative use thereof, opening and placing the package with the clear transparent resin placed face down in a mold and then placing the core body on said opposite face of said packaged materials, subjecting the combination of materials to heat and pressure to form its shape and polymerize the plastic resin composition to a cured state in said mold and removing said abuse resistant article of furniture from said mold as a finished article.

References Cited in the file of this patent
UNITED STATES PATENTS

| | | |
|---|---|---|
| 2,263,792 | Wood | Nov. 25, 1941 |
| 2,671,158 | Rubenstein | Mar. 2, 1954 |
| 2,751,775 | Sergovic | June 26, 1956 |
| 2,752,275 | Raskin et al. | June 26, 1956 |
| 2,753,642 | Sullivan | July 10, 1956 |
| 2,772,194 | Fisher et al. | Nov. 27, 1956 |
| 2,782,465 | Palmer | Feb. 26, 1957 |
| 2,805,448 | Rubenstein | Sept. 10, 1957 |
| 2,817,619 | Bickel et al. | Dec. 24, 1957 |
| 2,850,890 | Rubenstein | Sept. 9, 1958 |

FOREIGN PATENTS

| | | |
|---|---|---|
| 396,405 | Great Britain | Aug. 2, 1933 |

OTHER REFERENCES

"Tailor-Made Polyester Resin," Modern Plastic, pages 111–115, October 1947.

"Concrete Sealed by Glass Cloth and Resin," Concrete, June 1949, pages 12 and 45.

"Fillers for Plastics," Halls, British Plastics, October 1942, pages 352–358.